US012591637B2

(12) United States Patent
Denney et al.

(10) Patent No.: US 12,591,637 B2
(45) Date of Patent: Mar. 31, 2026

(54) TOKEN-BASED DATA AUTHORITY MANAGEMENT

(71) Applicant: THE BOEING COMPANY, Arlington, VA (US)

(72) Inventors: Timothy Alain Denney, Mountlake Terrace, WA (US); Alan Chong, Redmond, WA (US); Max Neal Jensen, Redmond, WA (US)

(73) Assignee: THE BOEING COMPANY, Arlington, VA (US)

( * ) Notice: Subject to any disclaimer, the term of this patent is extended or adjusted under 35 U.S.C. 154(b) by 165 days.

(21) Appl. No.: 18/502,835

(22) Filed: Nov. 6, 2023

(65) Prior Publication Data

US 2025/0148058 A1 May 8, 2025

(51) Int. Cl.
*H04L 29/06* (2006.01)
*G06F 21/10* (2013.01)
*H04L 9/32* (2006.01)

(52) U.S. Cl.
CPC ........ *G06F 21/1014* (2023.08); *H04L 9/3213* (2013.01)

(58) Field of Classification Search
CPC ............................ G06F 21/1014; H04L 9/3213
See application file for complete search history.

(56) References Cited

U.S. PATENT DOCUMENTS

| | | | | |
|---|---|---|---|---|
| 8,332,323 B2 * | 12/2012 | Stals | ...................... | G06Q 20/40 705/40 |
| 8,447,983 B1 * | 5/2013 | Beck | ..................... | H04L 9/0894 713/172 |
| 8,903,838 B2 | 12/2014 | Hunter et al. | | |
| 9,467,291 B2 | 10/2016 | Terao | | |
| 2015/0363424 A1 | 12/2015 | Strong et al. | | |

FOREIGN PATENT DOCUMENTS

| | | | | | |
|---|---|---|---|---|---|
| CN | 101520875 A | * | 9/2009 | | |
| CN | 104346383 A | * | 2/2015 | ......... | G06F 16/2452 |
| CN | 110490741 A | | 3/2023 | | |
| TW | M604432 U | | 11/2020 | | |
| WO | WO-2008029723 A1 | * | 3/2008 | ........... | H04L 9/3213 |

* cited by examiner

*Primary Examiner* — Shawnchoy Rahman
(74) *Attorney, Agent, or Firm* — Moore IP Law

(57) ABSTRACT

A device includes a memory configured to store a first token that indicates that a first entity has data authority of a first data object. The device also includes one or more processors configured to receive a data authority request from a second entity to transfer the data authority of the first data object to the second entity. The one or more processors are further configured to, based on a determination that a data authority transfer criterion is satisfied, generate a second token that indicates that the second entity has the data authority of the first data object. The one or more processors are further configured to generate a first reference that indicates that the second token is related and subsequent to the first token.

20 Claims, 14 Drawing Sheets

1300

200

300

400

500

600

700

1000

1100

1200

1300 ⬎

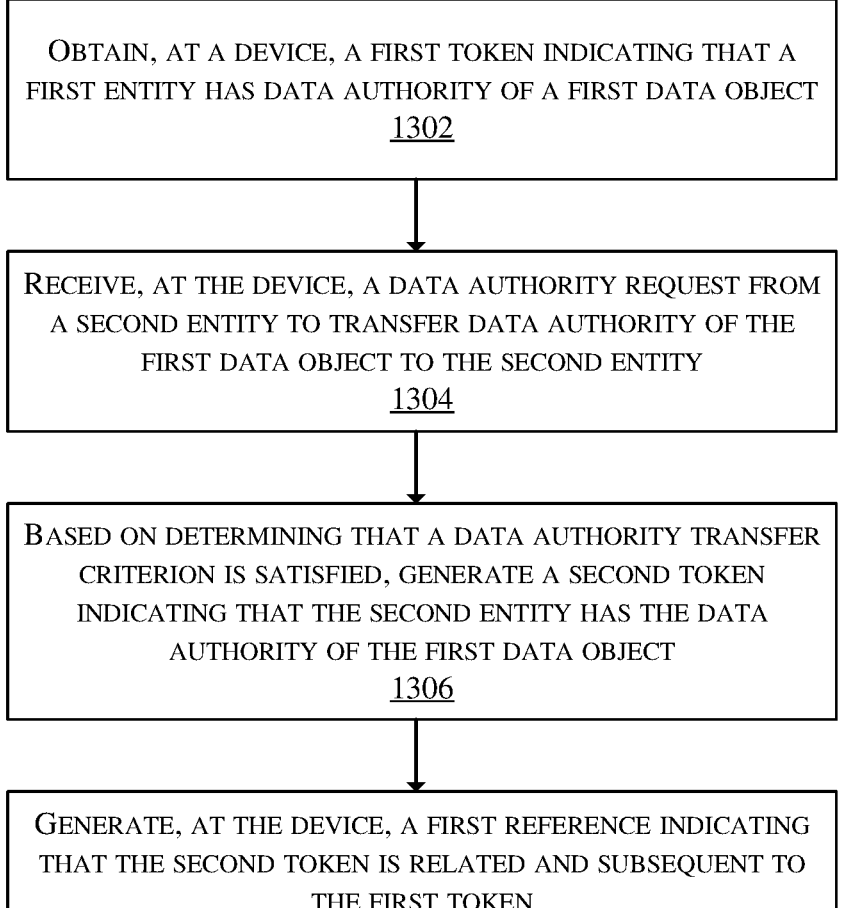

OBTAIN, AT A DEVICE, A FIRST TOKEN INDICATING THAT A
FIRST ENTITY HAS DATA AUTHORITY OF A FIRST DATA OBJECT
1302

RECEIVE, AT THE DEVICE, A DATA AUTHORITY REQUEST FROM
A SECOND ENTITY TO TRANSFER DATA AUTHORITY OF THE
FIRST DATA OBJECT TO THE SECOND ENTITY
1304

BASED ON DETERMINING THAT A DATA AUTHORITY TRANSFER
CRITERION IS SATISFIED, GENERATE A SECOND TOKEN
INDICATING THAT THE SECOND ENTITY HAS THE DATA
AUTHORITY OF THE FIRST DATA OBJECT
1306

GENERATE, AT THE DEVICE, A FIRST REFERENCE INDICATING
THAT THE SECOND TOKEN IS RELATED AND SUBSEQUENT TO
THE FIRST TOKEN
1308

FIG. 13

TOKEN-BASED DATA AUTHORITY MANAGEMENT

FIELD OF THE DISCLOSURE

The present disclosure is generally related to data authority management that uses a token-based approach.

BACKGROUND

Data management systems typically involve storing duplicate data files at different locations. Some approaches use a single master hierarchy to maintain data consistency and synchronize data content. With a single master hierarchy, a single master repository tracks and controls all operations that involve the creating, editing, or removing of data content across the different data files. These types of approaches require strong consistency. For example, before changes to a master data file can be made, all of the duplicates of the data file need to be synchronized. This type of synchronization is time-intensive and expensive.

SUMMARY

In a particular implementation, a device includes a memory configured to store a first token that indicates that a first entity has data authority of a first data object. The device also includes one or more processors configured to receive a data authority request from a second entity to transfer the data authority of the first data object to the second entity. The one or more processors are also configured to, based on a determination that a data authority transfer criterion is satisfied, generate a second token that indicates that the second entity has the data authority of the first data object. The one or more processors are further configured to generate a first reference that indicates that the second token is related and subsequent to the first token.

In another particular implementation, a method includes obtaining, at a device, a first token indicating that a first entity has data authority of a first data object. The method also includes receiving, at the device, a data authority request from a second entity to transfer data authority of the first data object to the second entity. The method further includes, based on determining that a data authority transfer criterion is satisfied, generating a second token indicating that the second entity has the data authority of the first data object. The method also includes generating, at the device, a first reference indicating that the second token is related to and subsequent to the first token.

In another particular implementation, a non-transitory computer readable medium stores instructions that, when executed by one or more processors, cause the one or more processors to obtain a first token that indicates that a first entity has data authority of a first data object. The instructions, when executed by the one or more processors, also cause the one or more processors to receive a data authority request from a second entity to transfer the data authority of the first data object to the second entity. The instructions, when executed by the one or more processors, further cause the one or more processors to, based on a determination that a data authority transfer criterion is satisfied, generating a second token that indicates that the second entity has the data authority of the first data object. The instructions, when executed by the one or more processors, also cause the one or more processors to generate a first reference that indicates that the second token is related and subsequent to the first token.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 13 is a flow chart of an example of a method of token-based data authority management.

DETAILED DESCRIPTION

Figure 1:
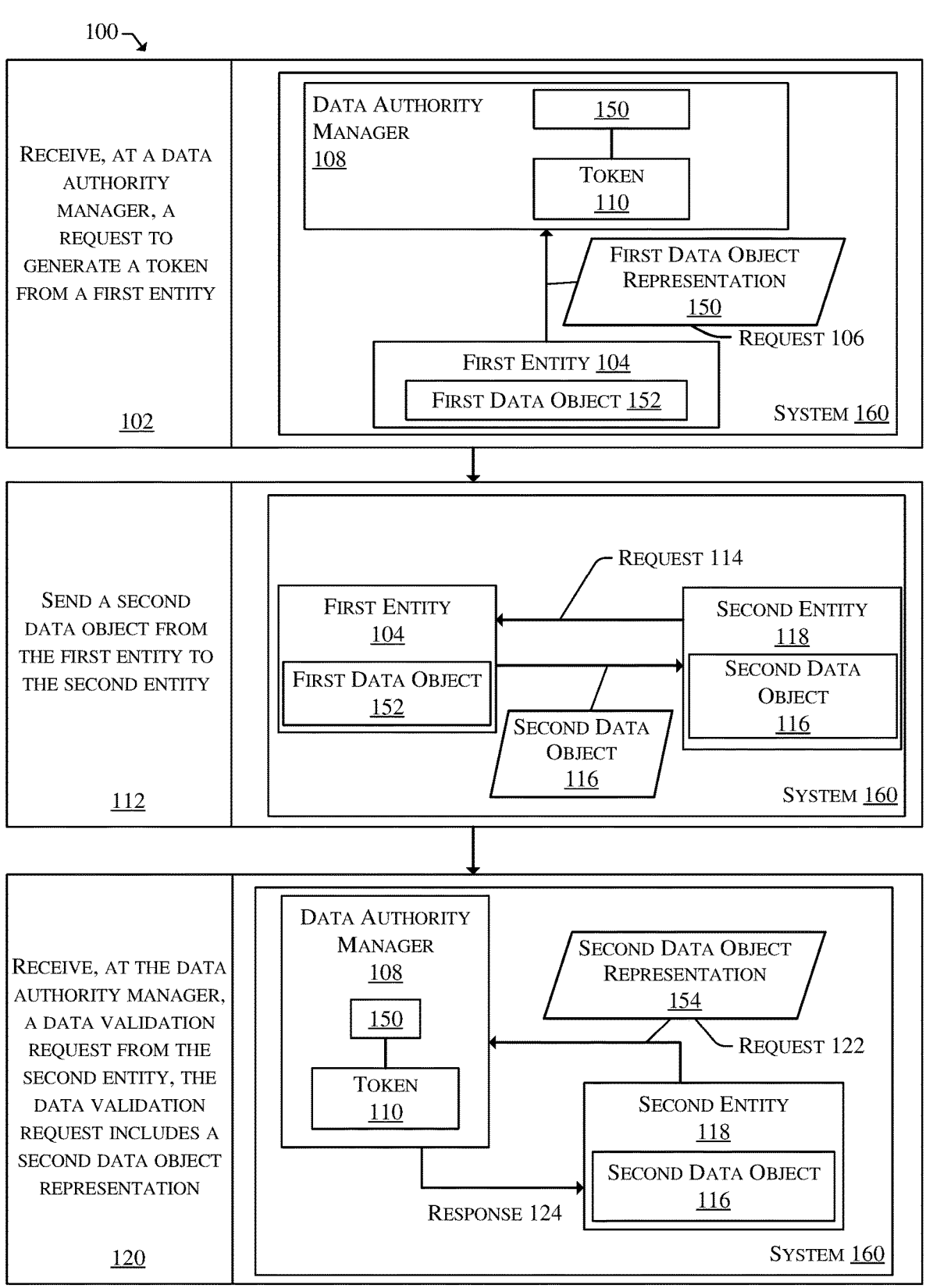
FIG. 1 is a diagram of an illustrative aspect of operations that can be performed at a system operable to use a token-based approach for managing data authority.

Typically, a data authority system includes a single master hierarchy and a master repository that stores a master data file. Duplicates of the master data file may be stored in other secondary repositories at other locations. With a single master hierarchy, the duplicate data files must reference the master data file. The master data file and the duplicate data files share the same data content. When a user at the location of one of the secondary repositories wants to change the data content, the data content is retrieved from the master data file as a temporary data file. Changes are then made to the data content in the temporary data file and the temporary data file is submitted for approval.

If the changes are not approved, no changes are made to the master data file. If the changes are approved, the temporary data file replaces the master data file in the master repository as the new master data file. In some cases, the changes that are made to the data content are then propagated to other secondary repositories such that the same changes are made to the duplicate data files. In other cases, the new master data file is duplicated and sent to replace the old duplicate files at the other secondary repositories.

These types of approaches can require strong consistency. For example, before changes to a master data file can be made, all of the duplicates of the data file need to be synchronized. This type of synchronization is time-intensive and expensive. Therefore, it is desirable to have data author- ity management that keeps a record of authority transfers, aligns disconnected data to its authoritative source, enables multi-organization authority, and/or has fallback plans if an authoritative source is not available.

Aspects disclosed herein present systems and methods for token-based data authority management. A data authority manager uses a token-based approach to record the lineage of data authority transfers between entities and/or modifi- cations to data objects. The data authority manager can be implemented in one or more devices, such as a public record or server. The data authority manager can be owned and/or operated by a central owner or a distributed owner that represents many public or private entities. This enables multiple organizations or entities to maintain consensus on a specific authority over a data object in the record. In some aspects, the data authority manager can operate using a distributed block-chain architecture to enable distributed data authority management.

The data authority manager can generate tokens of vari- ous types and a token can include type information indicat- ing the token type of the token. For example, the data authority manager can generate authority tokens, data tokens, request tokens, or a combination thereof. To illus- trate, the data tokens can include a data creation token, a data update token, and a data authority reverted token. The data creation token indicates addition by a particular entity of a data object for management by the data authority manager. The data update token indicates an updated version of the data object. The data authority reverted token indicates a rollback to a previous version of the data object.

The authority tokens can include the data creation token, a data authority transferred token, and the data authority reverted token. The data creation token indicates that the particular entity that added the data object for data authority management has data authority for the data object. The data authority transferred token indicates that data authority has been transferred to another entity. The data authority reverted token indicates that data authority is reverted to an entity that previously had data authority.

The request tokens can include a data authority requested token, a data authority denied token, or a combination thereof. For example, the data authority requested token indicates that data authority is requested by a particular entity and the data authority denied token indicates that the data authority request is denied. The request tokens corre- spond to documentation that provides a historical lineage of authority requests throughout the lifecycle of the data object.

A token (e.g., an authority token) indicates that a particu- lar entity has data authority (e.g., ownership) over a par- ticular data object, such as an image, a video, a data file, programming code, financial information, other types of data, or portions thereof. The particular data object may be changed, altered and/or subdivided by the particular entity while the particular entity has data authority over the par- ticular data object. Each of these modifications can be associated with a new token (e.g., a data update token) that is linked to the previous token. The data tokens correspond to documentation that provides a historical lineage of data updates throughout the lifecycle of the data object.

In some implementations, a token (e.g., a data token) does not contain the full body of the particular data object but instead has check data (e.g., a hash key) that is generated from the full body of the particular data object. A data object can be validated against the check data. For example, the check data can be used to validate data objects at other entities (e.g., distributed systems) to verify that the other entities have data objects that match the latest version of the particular data object. Comparisons of the check data (e.g., hash keys) can be much faster than comparing the data objects to each other. The check data can also be much smaller than the data object and take up less storage space.

A second entity can copy a data object from a first entity and then seek to have data authority transferred from the first entity to the second entity. For example, the second entity can send a request to the data authority manager to transfer authority to the second entity. The request includes check data associated with the data object. The data authority manager, upon receipt of the request, determines whether the check data included in the request matches the check data associated with a token that is the most recent data token of the data object. When the data authority manager detects a match, the data authority manager sends a transfer of author- ity request to the first entity (e.g., the entity that has data authority). The first entity can send a response to the data authority manager indicating whether the transfer to the second entity is approved. The data authority manager, in response to receiving approval from the first entity to transfer authority, generates a token (e.g., a data authority transferred token) documenting the transfer of data authority to the second entity. The authority tokens correspond to documentation that provides a historical lineage of authority changes throughout the lifecycle of the data object.

In addition, the data authority manager can, when an entity with data authority of a data object is unavailable, roll-back data authority to the previous entity that had authority. In some aspects, the data authority manager is configured to perform the roll-back independently, such as an automated roll-back after a period of time that the entity is unavailable. In other aspects, the data authority manager is configured to use a voting mechanism among all previous entities that had authority to pass or reject the roll-back. As an example, a third entity requests to have a copy of a data object from the second entity, which has authority over that data object. After a period of time, the third entity deter- mines that the second entity is unavailable based on the second entity being unresponsive. The third entity sends a request to the data authority manager to revert the data authority for the data object to an entity that previously had data authority. In some aspects, the data authority manager sends a request to all of the other entities that previously had authority and selects an entity based on responses to the request. In other aspects, the data authority manager selects an entity that is the most recent entity to have data authority (e.g., the first entity) prior to the second entity. In either situation, the data authority manager sends a request to the selected entity to accept a transfer of data authority. Once the selected entity sends a response accepting the transfer, the data authority manager generates a new token (e.g., a data authority reverted token) documenting the roll-back of authority to the selected entity.

The techniques and systems described herein enable data objects to be held and exchanged between various types of entities (e.g., having different states or architecture). The token-based data authority management also enables entities to copy the data objects from each other without having to retrieve the data objects from a central authority, while maintaining high performance caches thus resulting in reduction of slow data integrations and rigid requirements to keep data constantly in-synchronization. Furthermore, the techniques and systems described herein enable integration of data objects from multiple data authorities that may exist internally or externally to an organization. For example, a supplier to the organization can have authority over a data object while maintaining a documented traceable lineage of the data object.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number.

Figure 14:
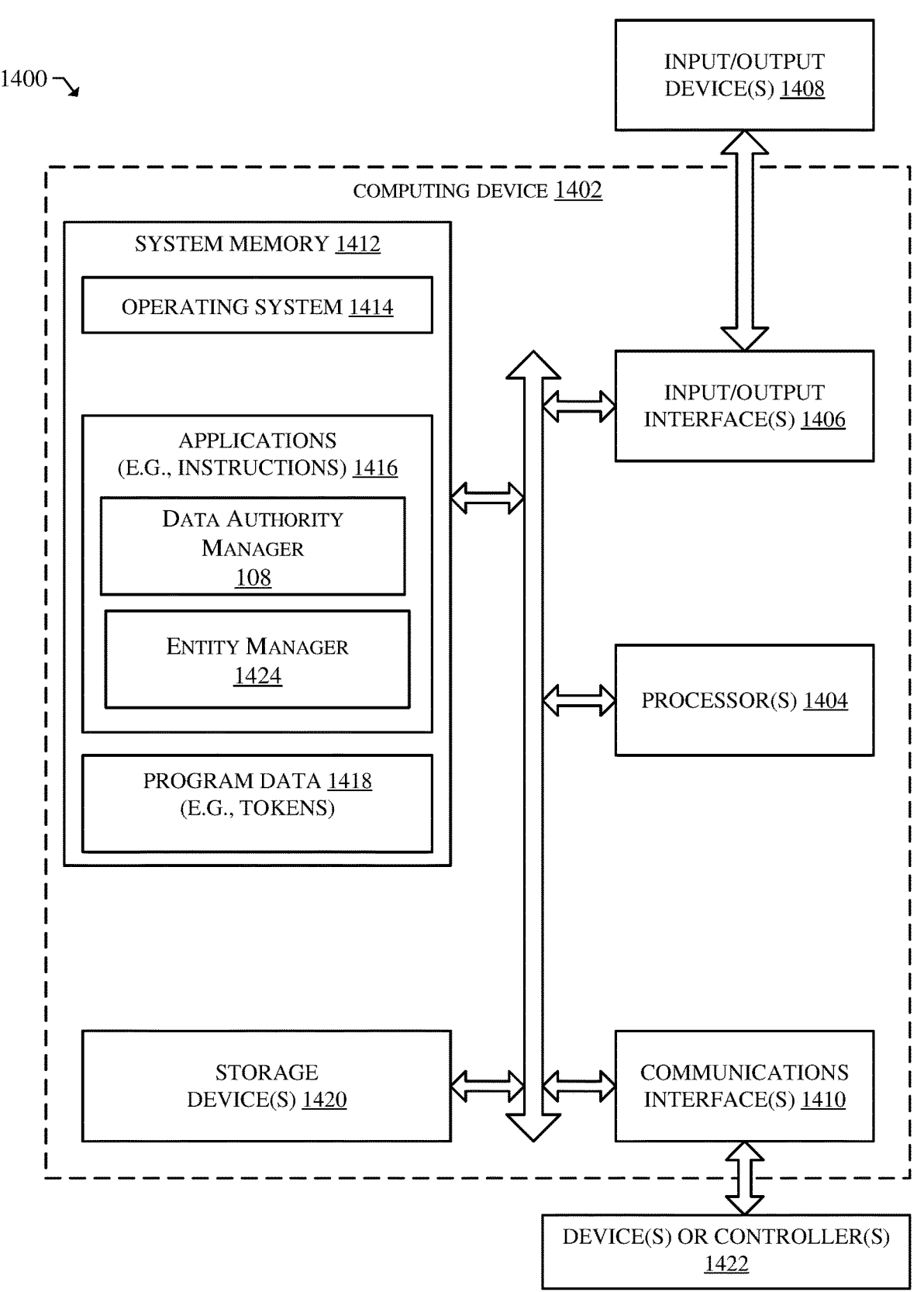
FIG. 14 is a block diagram of a computing environment including a computing device configured to support aspects of computer-implemented methods and computer-executable program instructions (or code) according to the present disclosure.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 14 depicts a computing device 1402 including one or more processors ("processor(s)" 1404 in FIG. 14), which indicates that in some implementations the computing device 1402 includes a single processor 1404 and in other implementations the computing device 1402 includes multiple processors 1404. For ease of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram 100 of an illustrative aspect of operations that can be performed by a system 160 that is operable to perform token-based data authority management. The system 160 includes a data authority manager 108 that is configured to be coupled to one or more entities. An entity can include a software application, an interface, a device, a system, a user, a network, an organization, or any other type of entity that is capable of having data authority of a data object, capable of accessing a data object, or both.

In some implementations, the system 160 is included in a single device. In these implementations, the one or more entities can correspond to different software applications on the same device. In some implementations, the system 160 corresponds to a distributed system with the data authority manager 108 on a first device and at least one entity on another device. In some implementations, the data authority manager 108 can be implemented on a distributed system, with some operations of the data authority manager 108 performed on one device and other operations of the data authority manager 108 performed on another device. In some implementations, one or more entities are internal to an organization and the data authority manager 108 is external to the organization. In some implementations, a first entity is internal to a first organization, a second entity is internal to a second organization that is distinct from the first organization, and the data authority manager 108 is external to both of the first organization and the second organization.

The data authority manager 108 is configured to receive token creation requests from one or more entities and to generate one or more tokens (e.g., data creation tokens) associated with one or more data objects. For example, the data authority manager 108 is configured to generate a token (e.g., a data creation token) indicating that a first entity has data authority of a data object in response to receiving a token creation request from the first entity that includes a data object representation of the data object and determining that the data object representation does not match data object representations associated with any previous tokens (e.g., previous data tokens) that are accessible to the data authority manager 108. In some implementations, the data authority manager 108 is configured to store one or more tokens at a memory, a server, a network, another device, or a combination thereof.

The data authority manager 108 is configured to receive data validation requests from one or more entities to validate data object representations and to generate responses indicating whether the data object representations are valid. For example, the data authority manager 108 is configured to, in response to receiving a data validation request from a second entity that includes a second data object representation of a second data object and based at least in part on determining that the second data object representation matches the first data object representation, send a response to the second entity indicating that the second data object representation is valid.

The data authority manager 108 is configured to transfer data authority of a data object from one entity to another entity. In an example, the data authority manager 108 is configured to detect that a second entity (that has data authority of a first data object) is unavailable based on determining that the second entity has been unresponsive for at least a threshold time, receiving a revert authority request from a third entity indicating that the second entity is unresponsive to the third entity, or both. In some implementations, the data authority manager 108 is configured to revert authority to an entity (e.g., the first entity) that most recently had data authority of the first data object prior to the second entity. In alternative implementations, the data authority manager 108 is configured to poll entities that previously had data authority of the first data object, select an entity based on the responses from the entities, and revert authority to the selected entity.

The diagram 100 illustrates examples of different stages of operation of the system 160. At a stage 102, the data authority manager 108 receives a token creation request 106 to generate a token 110 from a first entity 104. The token creation request 106 includes a first data object representation 150 of a first data object 152. In some aspects, the first entity 104 is configured to generate the first data object 152 or to retrieve the first data object 152 from a file repository.

The first entity 104 generates the first data object representation 150 of the first data object 152. In some implementations, the first data object representation 150 is a copy of the first data object 152. In other implementations, the first entity 104 generates check data of the first data object 152 and the first data object representation 150 includes the check data. According to some implementations, the check data can correspond to a hash of the first data object 152, an encryption of the first data object 152, a checksum of the first data object 152, or a combination thereof. In some implementations, the first data object representation 150 includes the check data and at least a portion of the first data object 152.

For some types of check data (e.g., hash), reconstructing the first data object 152 from the first data object representation 150 is impractical (e.g., time-consuming, or impossible). Sending these types of check data (instead of the first data object 152) as the first data object representation 150 to the data authority manager 108 can maintain confidentiality of the first data object 152 from the data authority manager 108. In an example, the first entity 104 is included within a first organization with data that is not to be shared outside the first organization. The data authority manager 108 can be outside the first organization and provide data authority management for the first organization using the data object representations without having access to the data objects. In some implementations, the data authority manager 108 can provide data authority management for multiple organizations using data object representations without having access to the data objects of the organizations.

The data authority manager 108, in response to receiving the token creation request 106, determines whether the first data object representation 150 matches a data object representation associated with any previous data tokens accessible to the data authority manager 108. The data authority manager 108 generates a token 110 (e.g., a data creation token) in response to determining that the first data object representation 150 does not match data object representations associated with any previous data token. The token 110 includes or is associated with the first data object representation 150 of the first data object 152 and a first entity identifier of the first entity 104. For example, the token 110 indicates that the first entity 104 having the first entity identifier has data authority of any data object (e.g., the first data object 152) that has a data object representation matching the first data object representation 150.

In some implementations, the data authority manager 108, in response to generating the token 110, sends a response (not shown in FIG. 1) to the first entity 104 indicating that the token 110 is successfully generated and that the first entity 104 is assigned as the data authority for the first data object 152.

At a stage 112, the first entity 104 sends a second data object 116 to a second entity 118. In some implementations, the first entity 104 sends the second data object 116 to the second entity 118 in response to receiving a request 114 from the second entity 118 to send a data object to the second entity 118. In some implementations, the first entity 104 sends the second data object 116 to the second entity 118 independently of the request 114. In an example, the first entity 104 sends data objects to the second entity 118 at various times. To illustrate, the first entity 104 can correspond to a drawing software that sends (e.g., publishes) computer-aided design (CAD) drawings as data objects to the second entity 118.

At a stage 120, the data authority manager 108 receives a data validation request 122 from the second entity 118, the data validation request 122 includes a second data object representation 154 of the second data object 116. The second entity 118 generates the second data object representation 154 of the second data object 116 in a similar manner as described with reference to the first entity 104 generating the first data object representation 150 of the first data object 152. For example, the second data object representation 154 can include at least a portion of the second data object 116, check data of the second data object 116, or both.

The data authority manager 108, in response to receiving the data validation request 122, determines whether the second data object representation 154 matches a data object representation associated with any data tokens accessible to the data authority manager 108. For example, the data authority manager 108 determines whether the first data object representation 150 associated with the token 110 matches the second data object representation 154 included in the data validation request 122.

In some implementations, the first data object representation 150 includes at least a portion of the first data object 152 and the second data object representation 154 includes at least a portion of the second data object 116. In some of these implementations, the data authority manager 108 determines that the first data object representation 150 matches the second data object representation 154 based on determining that at least the portion of the first data object 152 matches at least the portion of the second data object 116. Alternatively, the data authority manager 108 generates check data of at least the portion of the first data object 152, generates check data of at least the portion of the second data object 116, and determines that the first data object representation 150 matches the second data object representation 154 based on determining that the check data of at least the portion of the first data object 152 matches the check data of at least the portion of the second data object 116.

In a first implementation, the first data object representation 150 includes check data of at least a portion of the first data object 152 and the second data object representation 154 includes check data of at least a portion of the second data object 116. In a second implementation, the first data object representation 150 includes at least a portion of the first data object 152, and the data authority manager 108 generates check data of at least the portion of the first data object 152. In a third implementation, the second data object representation 154 includes at least a portion of the second data object 116, and the data authority manager 108 generates check data of at least the portion of the second data object 116. In some examples, in any of the first, second, or third implementations, the data authority manager 108 determines that the first data object representation 150 matches the second data object representation 154 based on determining that the check data of at least the portion of the first data object 152 matches the check data of at least the portion of the second data object 116.

The data authority manager 108, in response to determining that the second data object representation 154 matches the first data object representation 150 that is associated with the token 110, determines that the second data object representation 154 matches the token 110. The data authority manager 108, in response to determining that the second data object representation 154 matches the token 110 and that the token 110 is the most recent data token related to the first data object representation 150 of the first data object 152, sends a data validation response 124 to the second entity 118 indicating that the second data object representation 154 is valid. Alternatively, the data authority manager 108, in response to determining that the second data object representation 154 does not match a data object representation associated with any data tokens, sends a data validation response 124 to the second entity 118 indicating that the second data object representation 154 is invalid. In another example, the data authority manager 108, in response to determining that the second data object representation 154 matches a data object representation associated with a particular data token and that the particular data token is not the most recent data token associated with the data object representation, sends a data validation response 124 to the second entity 118 indicating that the second data object representation 154 is invalid (e.g., outdated), as further described with reference to FIG. 10.

A technical advantage of the system 160 includes enabling entities to copy data objects from each other without having to retrieve data objects from a central authority, while maintaining high performance caches thus resulting in reduction of slow data integrations and rigid requirements to keep data constantly in-synchronization. Furthermore, the system 160 enables the entities to confirm whether the data objects copied from another entity are valid (e.g., most recent or up to date). For example, entities within the same organization or in different organizations can exchange and validate data objects while maintaining confidentiality from the data authority manager 108 that can be external to the organization(s).

Figure 2:
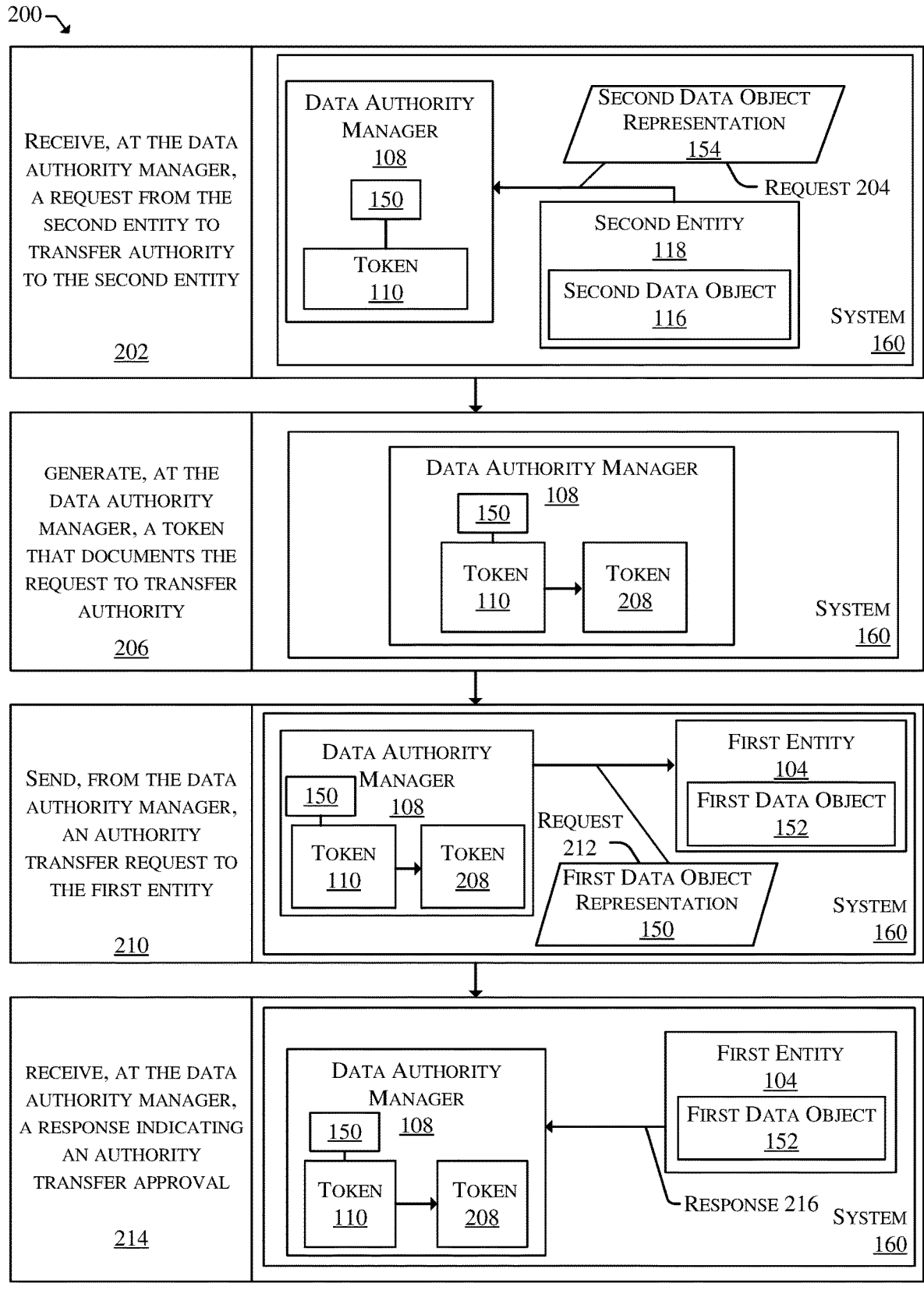
FIG. 2 is a diagram that illustrates an illustrative aspect of operations that can be performed by the system of FIG. 1.
Figure 3:
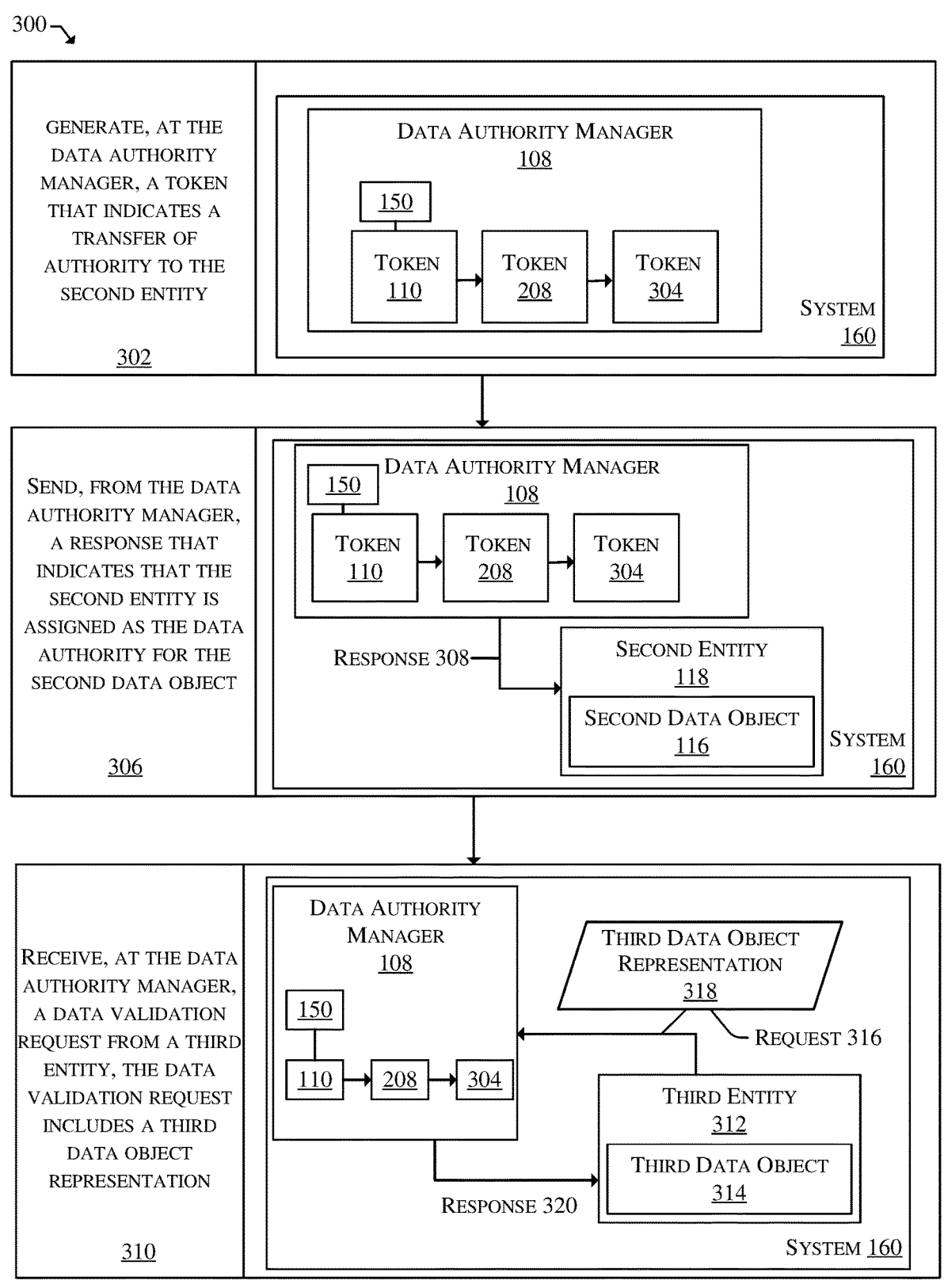
FIG. 3 is a diagram that illustrates an illustrative aspect of operations that can be performed by the system of FIG. 1.

FIGS. 2-3 illustrate an example of operations associated with a data authority transfer. FIG. 2 illustrates an example of the second entity 118 requesting data authority from the data authority manager 108 and the data authority manager 108 requesting approval of the data authority transfer from the first entity 104. FIG. 3 illustrates an example of the data authority manager 108 transferring the data authority to the second entity 118 upon approval from the first entity 104.

Referring to FIG. 2, a diagram 200 is shown of an illustrative aspect of operations that can be performed by the system 160 of FIG. 1. For example, the diagram 200 illustrates examples of different stages of operation of the system 160.

At a stage 202, the data authority manager 108 receives a data authority request 204 from the second entity 118 to transfer data authority to the second entity 118. The data authority request 204 includes the second data object representation 154 indicating that data authority is requested of data objects having a data object representation that matches the second data object representation 154. In some implementations, the data authority request 204 includes a second entity identifier of the second entity 118 indicating that the second entity 118 is requesting the data authority.

At a stage 206, the data authority manager 108, in response to receiving the data authority request 204, determines whether the second data object representation 154 matches a data object representation associated with any data tokens accessible to the data authority manager 108. For example, the data authority manager 108 determines whether the second data object representation 154 matches the first data object representation 150 associated with the token 110, as described with reference to FIG. 1.

The data authority manager 108, in response to determining that the second data object representation 154 matches the first data object representation 150 and that the first data object representation 150 is associated with the token 110, determines that the second data object representation 154 matches the token 110. According to some implementations, the data authority manager 108, in response to determining that the second data object representation 154 matches the token 110, generates a token 208 (e.g., a data authority requested token) indicating that the second entity 118 has requested data authority. For example, the token 208 includes a second entity identifier of the second entity 118. The data authority manager 108 also generates a reference indicating that the token 208 is related to and subsequent to the token 110. In some aspects, the data authority manager 108 generates the token 208 including a first reference to indicate that the token 208 is related and subsequent to the token 110. In some aspects, the data authority manager 108 updates the token 110 to include a second reference indicating that the token 208 is related and subsequent to the token 110.

Figure 5:
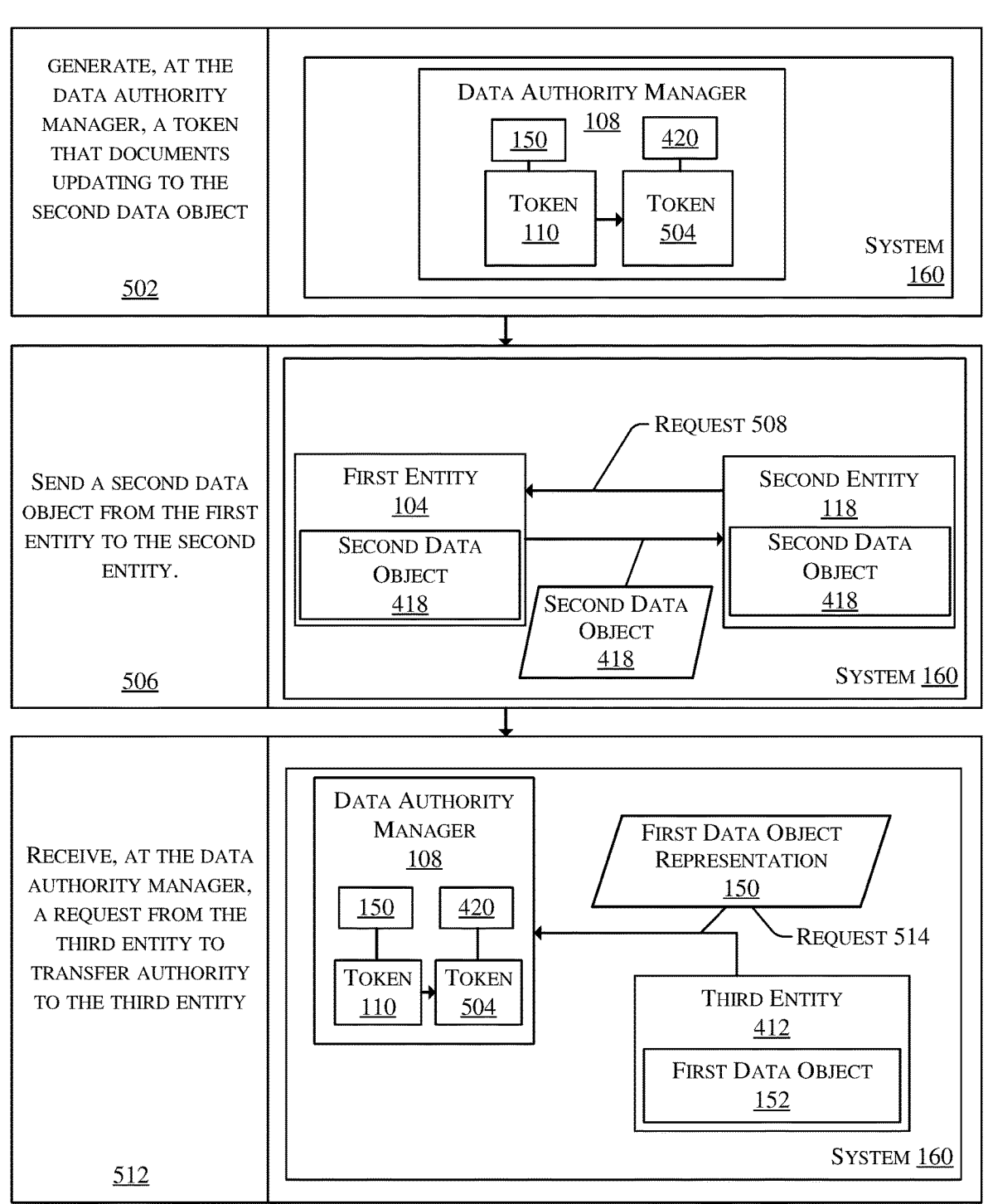
FIG. 5 is a diagram that illustrates an illustrative aspect of operations that can be performed by the system of FIG. 1.
Figure 6:
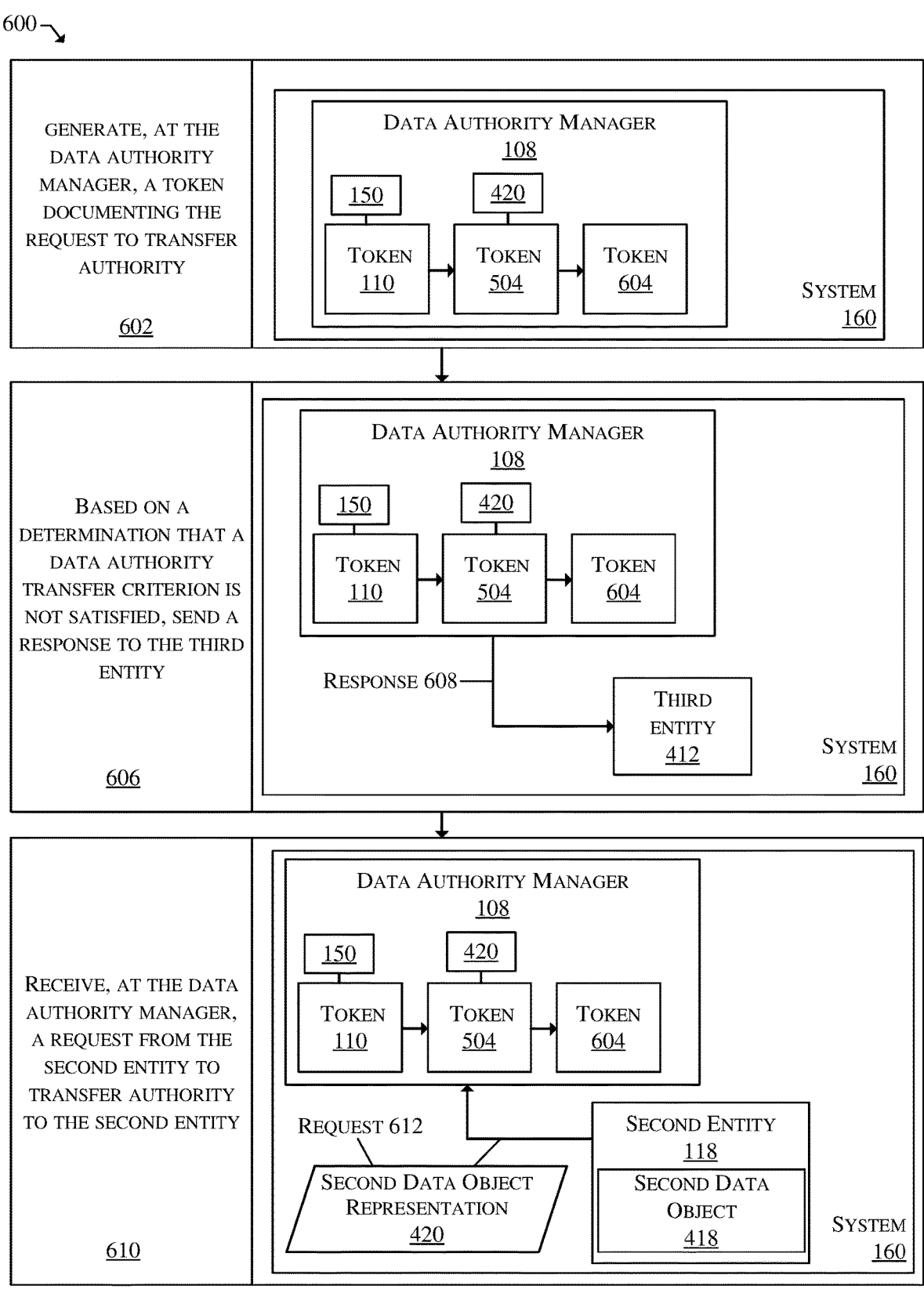
FIG. 6 is a diagram that illustrates an illustrative aspect of operations that can be performed by the system of FIG. 1.

In some examples, the data authority manager 108, in response to receiving the data authority request 204 and determining that the second data object representation 154 matches the token 110 and that the token 110 is not the most recent data token associated with the first data object representation 150, sends a data authority response to the second entity 118 indicating that the data authority transfer criterion is not satisfied, that the second data object representation 154 is outdated, or both, as further described with reference to FIGS. 5 and 6. In some implementations, the data authority manager 108 generates a token (e.g., a data authority denied token) indicating that the data authority request is denied and generates a reference indicating that the token is related and subsequent to the token 208. In an example, the token includes a second entity identifier of the second entity 118. In some implementations, the data authority manager 108 updates the token 208 to indicate that the data authority request is denied. In these implementations, the token 208 corresponds to a data authority requested token and a data authority denied token.

Alternatively, the data authority manager 108, in response to receiving the data authority request 204 and determining that the second data object representation 154 does not match a data object representation associated with any data tokens, determines that no entity has data authority associated with the second data object representation 154. In some implementations, the data authority manager 108, in response to determining that no entity has data authority associated with the second data object representation 154, sends a data authority response to the second entity 118 indicating that no entity has data authority of any data object having a data object representation that matches the second data object representation 154.

In some other implementations, the data authority manager 108, in response to determining that no entity has data authority associated with the second data object representation 154, considers the data authority request 204 as a token creation request 106 of FIG. 1 indicating the second data object representation 154. For example, the data authority manager 108 generates a token (e.g., a data creation token) associated with the second data object representation 154 and including the second entity identifier indicating that the second entity 118 has data authority of data objects that have a data object representation matching the second data object representation 154. In these implementations, the data authority manager 108 sends a data authority response to the second entity 118 indicating that the second entity 118 has data authority associated with the second data object representation 154.

At a stage 210, the data authority manager 108, in response to determining that the second data object representation 154 matches the token 110, that the token 110 is the most recent data token of the first data object representation 150 (e.g., indicating that the first data object representation 150 is up-to-date), and that the token 110 is the most recent authority token (e.g., there is no related and subsequent authority transfer or reversion token), sends an authority transfer request 212 to the first entity 104 that is indicated by the token 110 as having data authority. In some implementations, the authority transfer request 212 can include the first data object representation 150, the second entity identifier of the second entity 118, or both.

At a stage 214, the data authority manager 108 receives an authority transfer response 216 from the first entity 104 indicating whether a transfer of authority to the second entity 118 is approved. In an example, the first entity 104, based on a configuration setting, a user input, default data, or a combination thereof, determines whether to approve the authority transfer for data objects matching the first data object representation 150 of the first data object 152 to the second entity 118. In some implementations, the authority transfer response 216 includes the first data object representation 150 of the first data object 152.

Referring to FIG. 3, a diagram 300 is shown of an illustrative aspect of operations that can be performed by the system 160 of FIG. 1. For example, the diagram 300 illustrates examples of different stages of operation of the system 160 that are subsequent to the stages of operations illustrated in the diagram 200 of FIG. 2.

At a stage 302, the data authority manager 108, in response to determining that the authority transfer response 216 of FIG. 2 received from the first entity 104 indicates that the transfer of authority to the second entity 118 is approved, determines that a data authority transfer criterion is satisfied. The data authority manager 108, in response to determining that the data authority transfer criterion is satisfied, generates a token 304 (e.g., a data authority transferred token) that indicates a transfer of data authority to the second entity 118.

The data authority manager 108, in response to determining that the data authority transfer criterion is satisfied, also generates a reference that indicates that the token 304 is related and subsequent to the token 208, the token 110, or both. For example, the token 304 and a reference (e.g., a chain of references) from the token 304 to the token 110 indicates that the second entity 118 has data authority of any data object (e.g., the first data object 152, the second data object 116, one or more additional data objects, or a combination thereof) with a data object representation matching the first data object representation 150 associated with the token 110. The authority tokens linked with the references correspond to documentation of a historical lineage of authority changes throughout the lifecycle of the data object.

In some implementations, a first reference indicates that the token 208 is related and subsequent to the token 110 and a second reference indicates that the token 304 is related and subsequent to the token 208. In these implementations, the combination of the first reference and the second reference indicates that the token 304 is related and subsequent to the token 110. In some implementations, the data authority manager 108 generates a third reference directly connecting the token 304 and the token 110 indicating that the token 304 is related and subsequent to the token 110.

In some implementations, the data authority manager 108 does not generate the token 208 to indicate that data authority is requested. In these implementations, the data authority manager 108, in response to determining that the data authority transfer criterion is satisfied, generates a reference indicating that the token 304 is related and subsequent to the token 110 (e.g., without any references associated with the token 208).

At a stage 306, the data authority manager 108, in response to determining that the data authority transfer criterion is satisfied, sends a data authority response 308 to the second entity 118 that indicates that the second entity 118 is assigned as the data authority associated with the second data object representation 154 of the second data object 116. In some implementations, the data authority response 308 includes the second data object representation 154 indicating that the second entity 118 has data authority over any data object (e.g., the first data object 152, the second data object 116, one or more additional data objects, or a combination thereof) having a data object representation that matches the second data object representation 154.

Alternatively, the data authority manager 108, in response to receiving the authority transfer response 216 of FIG. 2 from the first entity 104 indicating that the transfer of authority is not approved, determines that the data authority transfer criterion is not satisfied. The data authority manager 108, in response to determining that the data authority transfer criterion is not satisfied, sends a data authority response to the second entity 118 indicating that the data authority transfer criterion is not satisfied, that the first entity 104 has denied the request to transfer authority, or both. In some implementations, the data authority manager 108 generates a token (e.g., a data authority denied token) indicating that the transfer authority request is denied by the first entity 104 and generates a reference indicating that the token is related and subsequent to the token 208. In an example, the token includes a first entity identifier of the first entity 104, a second entity identifier of the second entity 118, or both. In some implementations, the data authority manager 108, in response to determining that the data authority transfer criterion is not satisfied, updates the token 208 to indicate that the transfer authority request is denied by the first entity 104. In these implementations, the token 208 corresponds to a data authority requested token and a data authority denied token.

At a stage 310, the data authority manager 108 receives a data validation request 316 from a third entity 312, the data validation request 316 includes a third data object representation 318 of a third data object 314. The third entity 312 generates the third data object representation 318 of the third data object 314 in a similar manner as described with reference to the first entity 104 generating the first data object representation 150 of the first data object 152. For example, the third data object representation 318 can include at least a portion of the third data object 314, check data of the third data object 314, or both.

The data authority manager 108, in response to receiving the data validation request 316, determines whether the third data object representation 318 matches a data object representation associated with any data tokens accessible to the data authority manager 108. For example, the data authority manager 108 determines whether the first data object representation 150 associated with the token 110 matches the third data object representation 318 included in the data validation request 316.

The data authority manager 108, in response to determining that the third data object representation 318 matches the first data object representation 150 that is associated with the token 110, determines that the third data object representation 318 matches the token 110. The data authority manager 108, in response to determining that the third data object representation 318 matches the token 110 and that the token 110 is the most recent data token related to the first data object representation 150, sends a data validation response 320 to the third entity 312 indicating that the third data object representation 318 is valid. Alternatively, the data authority manager 108, in response to determining that the third data object representation 318 does not match a data object representation associated with any data tokens, sends a data validation response 320 to the third entity 312 indicating that the third data object representation 318 is invalid. In another example, the data authority manager 108, in response to determining that the third data object representation 318 matches a data object representation associated with a particular data token and that the particular data token is not the most recent data token associated with the data object representation, sends a data validation response 320 to the third entity 312 indicating that the third data object representation 318 is invalid (e.g., outdated), as further described with reference to FIG. 10.

A technical advantage of the system 160 includes enabling the second entity 118 to initiate a transfer of data authority and selectively transferring the data authority based on approval from the first entity 104. The data authority can thus be transferred between entities over the lifetime of a data object and does not have to permanently reside with a single central authority.

Figure 4:
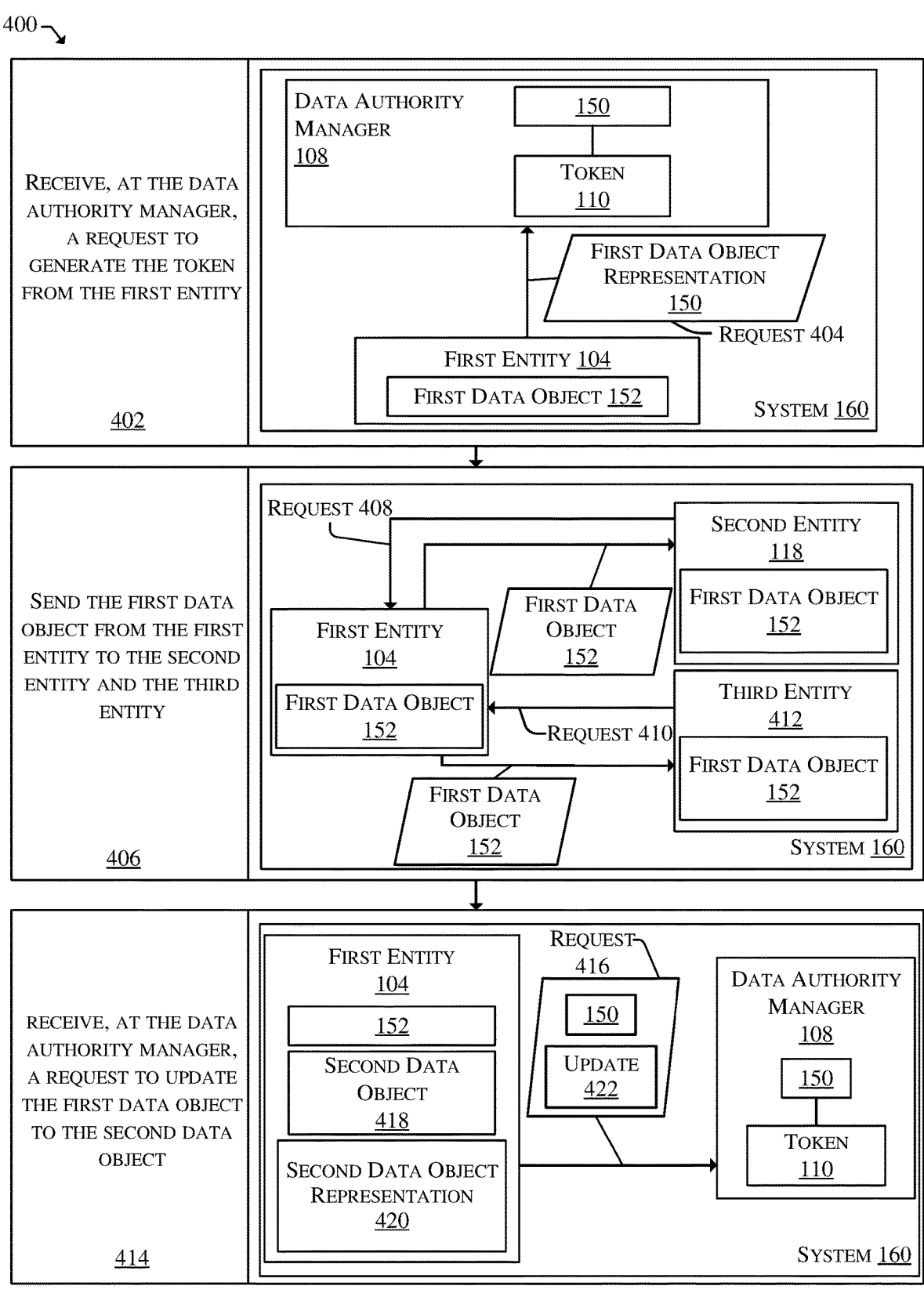
FIG. 4 is a diagram that illustrates an illustrative aspect of operations that can be performed by the system of FIG. 1.
Figure 7:
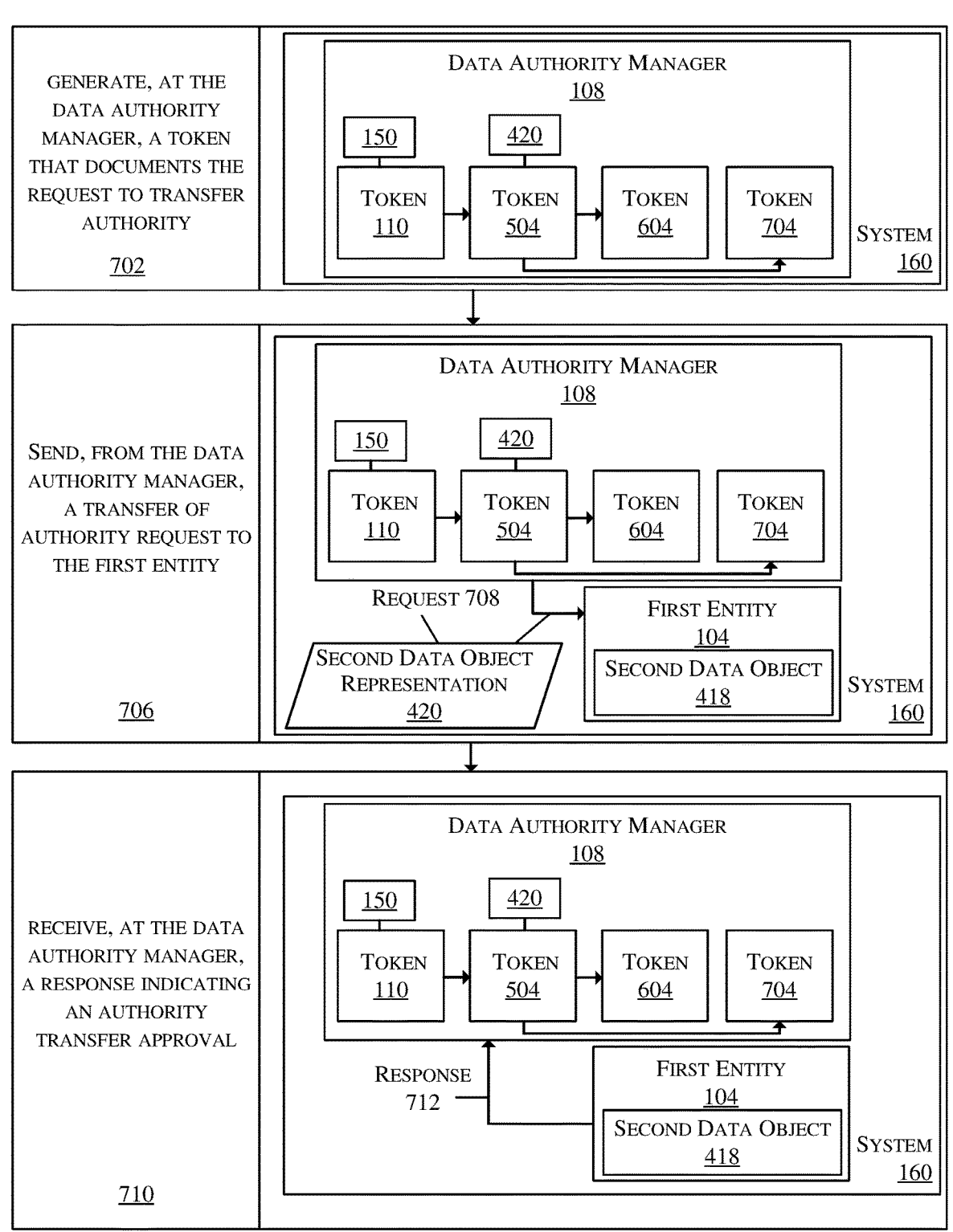
FIG. 7 is a diagram that illustrates an illustrative aspect of operations that can be performed by the system of FIG. 1.
Figure 8:
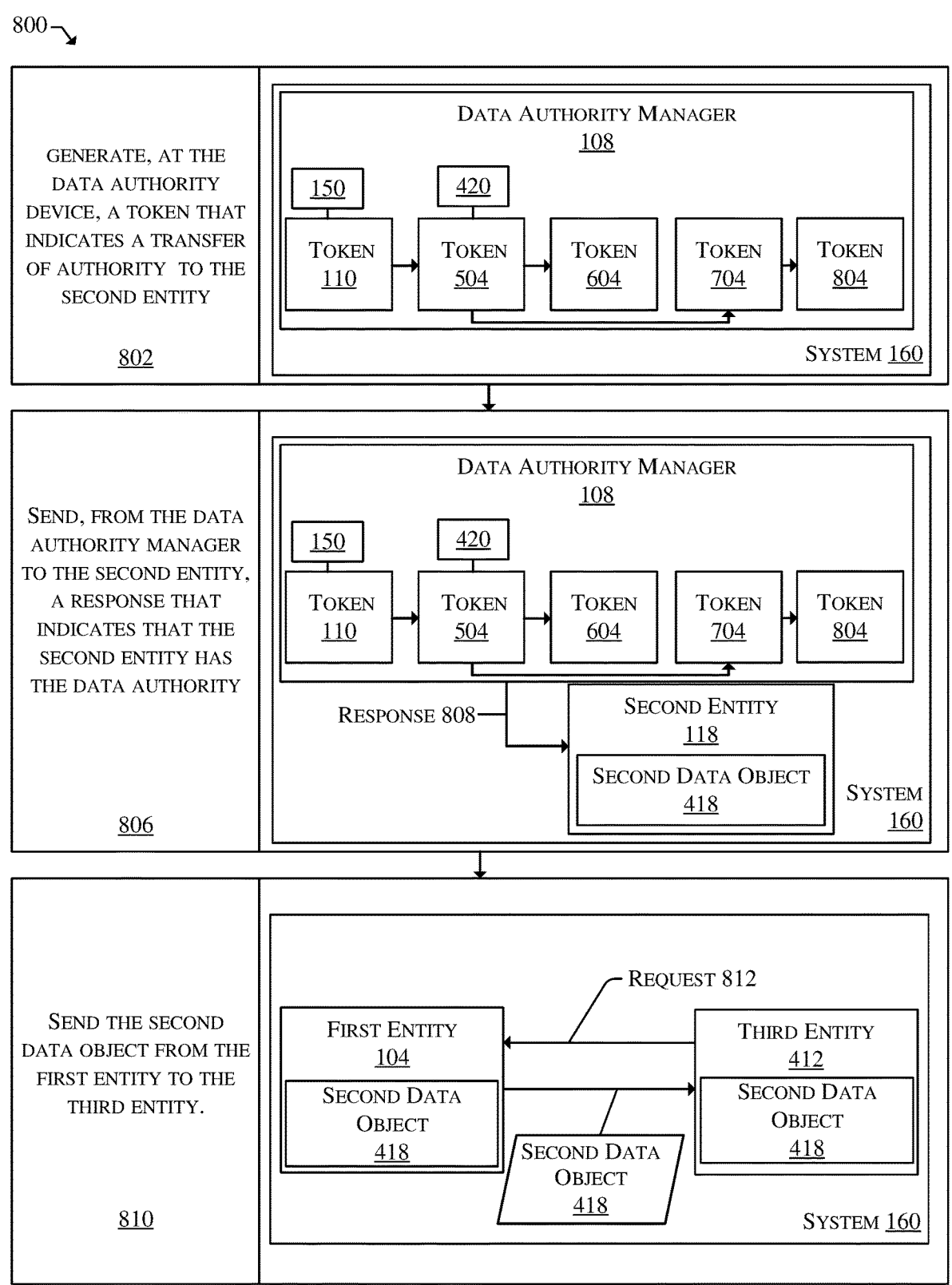
FIG. 8 is a diagram that illustrates an illustrative aspect of operations that can be performed by the system of FIG. 1.
Figure 9:
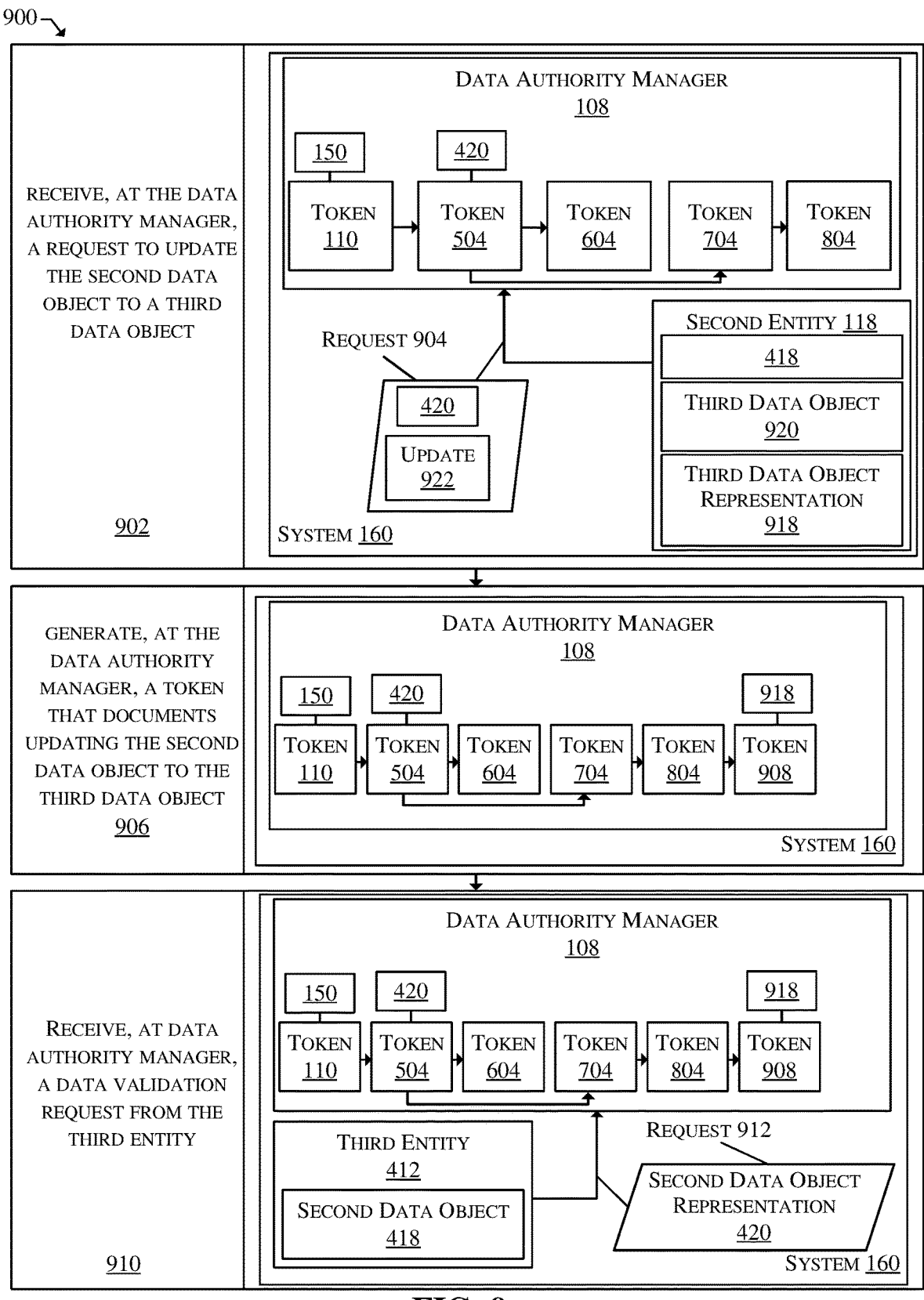
FIG. 9 is a diagram that illustrates an illustrative aspect of operations that can be performed by the system of FIG. 1.
Figure 10:
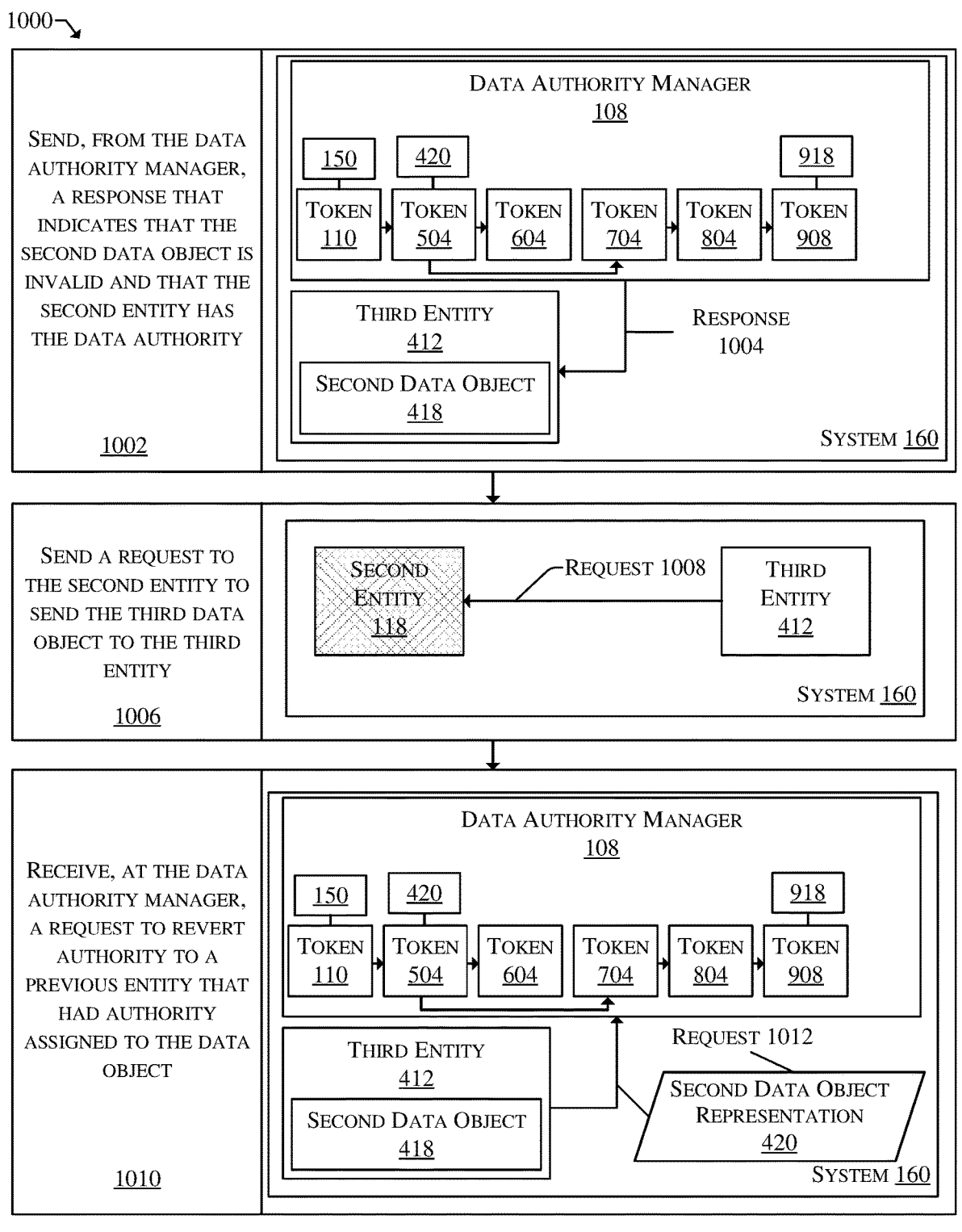
FIG. 10 is a diagram that illustrates an illustrative aspect of operations that can be performed by the system of FIG. 1.
Figure 11:
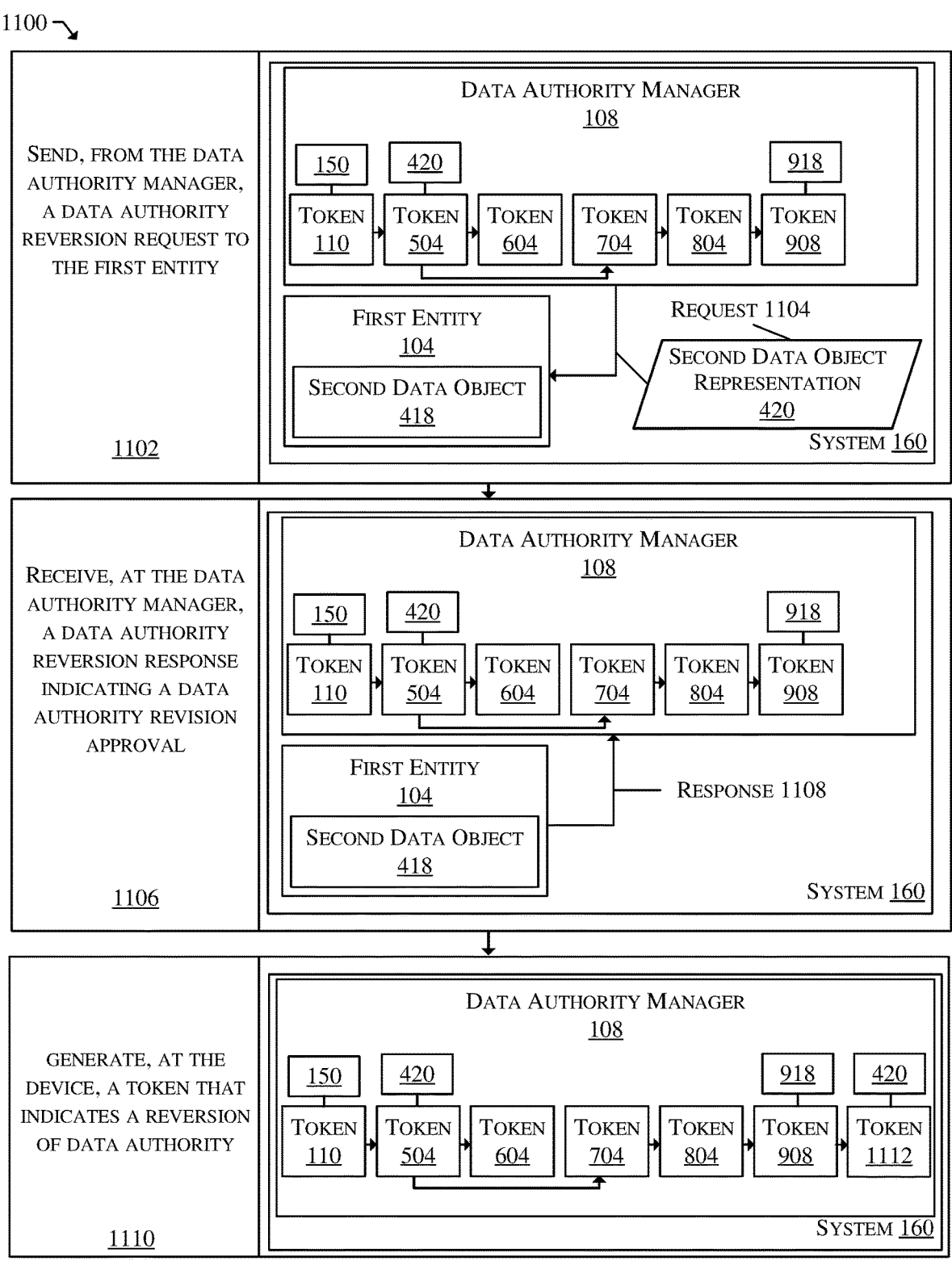
FIG. 11 is a diagram that illustrates an illustrative aspect of operations that can be performed by the system of FIG. 1.

FIGS. 4-11 illustrate examples of operations associated with some use cases of data authority management. FIG. 4 illustrates an example of a first entity with data authority updating a first data object to a second data object. FIG. 5 illustrates an example of a third entity with the first data object (e.g., an outdated data object) requesting data authority. FIG. 6 illustrates an example of data authority transfer being denied to the third entity with the outdated data object and a second entity with the second data object (e.g., an updated data object) requesting data authority. FIG. 7 illustrates an example of obtaining approval from the first entity to transfer data authority to the second entity with the updated data object. FIG. 8 illustrates an example of granting data authority to the second entity and the third entity obtaining the second data object from the first entity. FIG. 9 illustrates an example of the second entity with data authority updating the second data object to a third data object and receiving a data validation request from the third entity with the second data object (e.g., an outdated data object). FIG. 10 illustrates an example of the third entity requesting authority to be reverted after detecting that the second entity is unresponsive. FIG. 11 illustrates an example of reverting data authority to the first entity and performing a rollback from the third data object to the second data object.

Referring to FIG. 4, a diagram 400 is shown of an illustrative aspect of operations that can be performed by the system 160 of FIG. 1. For example, the diagram 400 illustrates examples of different stages of operation of the system 160.

At a stage 402, the data authority manager 108 receives a token creation request 404 to generate a token 110 from the first entity 104. The token creation request 404 includes the first data object representation 150 of the first data object 152.

The data authority manager 108 generates the token 110 (e.g., a data creation token) in response to receiving the token creation request 404. For example, the data authority manager 108 performs similar operations as described with reference to generating the token 110 responsive to receiving the token creation request 106 of FIG. 1.

At a stage 406, the first entity 104 sends the first data object 152 to the second entity 118 and a third entity 412. In some implementations, the first entity 104 sends the first data object 152 to the second entity 118 in response to receiving a request 408 from the second entity 118 to send the first data object 152 to the second entity 118. In some implementations, the first entity 104 sends the first data object 152 to the third entity 412 in response to receiving a request 410 from the third entity 412 to send the first data object 152 to the third entity 412.

In some implementations, the first entity 104 sends the first data object 152 to an entity independently of receiving a request for the first data object. For example, the first entity 104 sends data objects to the second entity 118, the third entity 412, or both, at various times. To illustrate, the first entity 104 can correspond to a drawing software that sends (e.g., publishes) CAD drawings as data objects to the second entity 118, the third entity 412, or both.

At a stage 414, the data authority manager 108 receives a data update request 416 from the first entity 104 to update the first data object 152 to a second data object 418. The data update request 416 includes an update 422. In some implementations, the data update request 416 also includes the first data object representation 150 of the first data object 152.

In some aspects, the first entity 104 is configured to generate the second data object 418. For example, the first data object 152 can be a CAD drawing and the second data object 418 corresponds to an update or modification of the CAD drawing. The first entity 104 generates the second data object representation 420 of the second data object 418. In some examples, the second data object representation 420 includes check data, at least a portion, or both, of the second data object 418. In some examples, the update 422 indicates a difference between the first data object representation 150 and the second data object representation 420, and the data authority manager 108 generates the second data object representation 420 based on applying the update 422 to the first data object representation 150. In other examples, the update 422 includes the second data object representation 420.

A technical advantage of the system 160 includes enabling the first entity 104 with data authority to update the data object without having to synchronize each update of the data object with other entities. For example, the other entities can use the data authority manager 108 to validate whether their copy of the data object is up to date if and when the data object is to be used at the other entity.

Referring to FIG. 5, a diagram 500 is shown of an illustrative aspect of operations that can be performed by the system 160 of FIG. 1. For example, the diagram 500 illustrates examples of different stages of operation of the system 160 that are subsequent to the stages of operations illustrated in the diagram 400 of FIG. 4.

At a stage 502, the data authority manager 108, in response to receiving the data update request 416 of FIG. 4 from the first entity 104, determines whether the first data object representation 150 included in the data update request 416 matches a data object representation associated any data token accessible to the data authority manager 108. For example, the data authority manager 108, in response to determining that the first data object representation 150 matches the first data object representation 150 associated with the token 110, determines that the first data object representation 150 matches the token 110. The data authority manager 108, in response to determining that there is no data update token that is related and subsequent to the token 110, determines that the token 110 is the most recent data token. The data authority manager 108, in response to determining that there is no authority token that is related and subsequent to the token 110, determines that the token 110 is the most recent authority token and that the first entity 104 indicated by the token 110 has data authority.

The data authority manager 108, in response to determining that the first data object representation 150 matches the token 110, that the token 110 is the most recent data token, and that the first entity 104 has data authority, generates a token 504 (e.g., a data update token) indicating a data update. For example, the token 504 includes or is associated with the second data object representation 420 of the second data object 418 (e.g., an updated version of the first data object 152). The data authority manager 108 also generates a reference that indicates that the token 504 is related and subsequent to the token 110. In some implementations, the data authority manager 108, in response to generating the token 504, sends a response to the first entity 104 indicating that the data update is successful.

At a stage 506, the first entity 104 sends the second data object 418 to the second entity 118. In some implementations, the first entity 104 sends the second data object 418 to the second entity 118 in response to receiving a request 508 from the second entity 118 to send a data object to the second entity 118. In some implementations, the first entity 104 sends the second data object 418 to the second entity 118 independently of the request 508.

At a stage 512, the data authority manager 108 receives a data authority request 514 from the third entity 412 to transfer data authority to the third entity 412. The data authority request 514 includes the first data object representation 150 of the first data object 152 that the first entity 104 provided to the third entity 412, as described with reference to the stage 406 of FIG. 4. The third entity 412 generates the first data object representation 150 of the first data object 152 and sends the data authority request 514 including the first data object representation 150 to the data authority manager 108. For example, the third entity 412 generates the data authority request 514 in response to determining that the third entity 412 is to modify the first data object 152. To illustrate, the third entity 412 determines that the first data object 152 is to be modified by the third entity 412 based on a configuration setting, default data, a user input, one or more operations, or a combination thereof.

Referring to FIG. 6, a diagram 600 is shown of an illustrative aspect of operations that can be performed by the system 160 of FIG. 1. For example, the diagram 600 illustrates examples of different stages of operation of the system 160 that are subsequent to the stages of operations illustrated in the diagram 500 of FIG. 5.

At a stage 602, the data authority manager 108, in response to receiving the data authority request 514 of FIG. 5 from the third entity 412, determines whether the first data object representation 150 included in the data authority request 514 matches a data object representation associated with any data tokens accessible to the data authority manager 108. The data authority manager 108, in response to determining that the first data object representation 150 matches the token 110, generates a token 604 (e.g., a data authority requested token) that indicates that data authority is requested and generates a reference indicating that the token 604 is related and subsequent to the token 110. For example, the data authority manager 108, based on the reference indicating that the token 504 is related and subsequent to the token 110 and no references indicate any token related and subsequent to the token 504, identifies the token 504 as the most recent token that is related to the token 110 and generates a reference indicating that the token 604 is related and subsequent to the most recent token (e.g., the token 504).

At a stage 606, the data authority manager 108, in response to determining that the token 504 is a data update token and is related and subsequent to the token 110, determines that the token 110 is not the most recent data token and is associated with an outdated data object. The data authority manager 108, in response to determining that the first data object representation 150 included in the data authority request 514 matches the token 110, that the token 110 is not the most recent data token, that the token 504 is the most recent data token related to the first data object representation 150, and that the first data object representation 150 does not match the second data object representation 420 associated with the token 504, determines that a data authority transfer criterion is not satisfied.

In some implementations, the data authority manager 108, in response to determining that the data authority transfer criterion is not satisfied, updates the token 604 to indicate that the data authority request is denied. In these implementations, the token 604 corresponds to a data authority requested token and a data authority denied token. In other implementations, the data authority manager 108, in response to determining that the data authority transfer criterion is not satisfied, generates a token (e.g., a data authority denied token) and a reference indicating that the token is related and subsequent to the token 604.

The data authority manager 108, in response to determining that the data authority transfer criterion is not satisfied, sends a response 608 to the third entity 412 indicating that the data authority request is denied. In some implementations, the response 608 indicates that the first data object representation 150 included in the data authority request 514 corresponds to an outdated data object. In some implementation, the data authority manager 108, in response to identifying the token 504 as the most recent data token related and subsequent to the token 110 and determining that the token 504 indicates that the first entity 104 has data authority, generates the response 608 indicating that the first entity 104 has data authority. In some aspects, the third entity 412, in response to receiving the response 608, can request an updated data object from the first entity 104, as further described with reference to FIG. 8.

At a stage 610, the data authority manager 108 receives a data authority request 612 from the second entity 118 to transfer data authority to the second entity 118. The data authority request 612 includes the second data object representation 420 of the second data object 418 that the first entity 104 provided to the second entity 118, as described with reference to the stage 506 of FIG. 5.

A technical advantage of the system 160 includes enabling the data authority manager 108 to deny data authority transfers to entities with outdated or invalid versions of a data object. For example, checking whether an entity requesting data authority has an up-to-date copy of a data object can be performed efficiently as an initial filter. In some aspects, the data authority manager 108 also indicates the data authority to enable the entity to request an up-to-date version of the data object.

Referring to FIG. 7, a diagram 700 is shown of an illustrative aspect of operations that can be performed by the system 160 of FIG. 1. For example, the diagram 700 illustrates examples of different stages of operation of the system 160 that are subsequent to the stages of operations illustrated in the diagram 600 of FIG. 6.

At a stage 702, the data authority manager 108, in response to receiving the data authority request 612 of FIG. 6 from the second entity 118, determines whether the second data object representation 420 included in the data authority request 612 matches a data object representation associated with any data tokens accessible to the data authority manager 108. The data authority manager 108, in response to determining that the second data object representation 420 matches the token 504, generates a token 704 (e.g., a data authority requested token) that indicates that data authority is requested and generates a reference indicating that the token 704 is related and subsequent to the token 504.

In some implementations, the data authority manager 108 identifies a most recent token that is related to the token 504 and generates a reference indicating that the token 704 is related and subsequent to the most recent token. For example, the data authority manager 108, based on one or more references indicating that a particular token (e.g., the token 604) is related and subsequent to the token 504 and no references indicate any token related and subsequent to the particular token, identifies the particular token as the most recent token that is related to the token 504 and generates a reference indicating that the token 704 is related and subsequent to the most recent token.

In some implementations, the data authority manager 108 identifies a most recent data token that is related to the token 504 and generates a reference indicating that the token 704 is related and subsequent to the most recent data token. For example, the data authority manager 108, based on determining that there are no references indicating a data token that is related and subsequent to the token 504, identifies the token 504 as the most recent data token that is related to the token 504 and generates a reference indicating that the token 704 is related and subsequent to the token 504.

In some implementations, the data authority manager 108, identifies a most recent authority token that is related to the token 504 and generates a reference indicating that the token 704 is related and subsequent to the most recent authority token. For example, the data authority manager 108, based on determining that the token 504 is a data update token and not an authority token and that no references indicate another authority token subsequent to the token 504, identifies the token 110 as the most recent authority token that is related to the token 504 and generates a reference indicating that the token 704 is related and subsequent to the token 110.

At a stage 706, the data authority manager 108, in response to determining that the second data object representation 420 included in the data authority request 612 matches the token 504, that the token 504 is the most recent data token related to the token 504, and that the token 110 is the most recent authority token related to the token 504, determines that the first entity 104 indicated by the token 110 has data authority and sends an authority transfer request 708 to the first entity 104 to authorize transfer of the data authority to the second entity 118. In some implementations, the authority transfer request 708 includes the second data object representation 420, a second entity identifier of the second entity 118, or both.

At a stage 710, the data authority manager 108 receives an authority transfer response 712 from the first entity 104 indicating whether a transfer of authority to the second entity 118 is approved. In some implementations, the authority transfer response 712 includes the second data object representation 420 of the second data object 418.

A technical advantage of the system 160 includes enabling the first entity 104 with data authority to approve or deny authority transfers. For example, the entities acting as data authorities can use various rules (e.g., organizational rules, entity rules, or both) to allow authority transfers without a single central entity (e.g., the data authority manager 108) having access and management of all the rules.

Referring to FIG. 8, a diagram 800 is shown of an illustrative aspect of operations that can be performed by the system 160 of FIG. 1. For example, the diagram 800 illustrates examples of different stages of operation of the system 160 that are subsequent to the stages of operations illustrated in the diagram 800 of FIG. 8.

At a stage 802, the data authority manager 108, in response to determining that the authority transfer response 712 of FIG. 7 received from the first entity 104 indicates that transfer of authority is approved, determines that a data authority transfer criterion is satisfied. The data authority manager 108, in response to determining that the data authority transfer criterion is satisfied, generates a token 804 (e.g., a data authority transferred token) that indicates a transfer of authority to the second entity 118 and generates a reference indicating that the token 804 is related and subsequent to the token 704, the token 604, the token 504, the token 110, or a combination thereof. The authority tokens linked with references correspond to documentation of a historical lineage of authority changes throughout the lifecycle of the data object. For example, the token 110, the token 504, and the token 804 indicate that the first entity 104 had data authority of data objects having data object representations that match the first data object representation 150, that the first entity 104 updated the data object and that the second data object representation 420 corresponds to the updated data object, and that data authority has been transferred from the first entity 104 to the second entity 118.

At a stage 806, the data authority manager 108, in response to determining that the data authority transfer criterion is satisfied, sends a data authority response 808 to the second entity 118 that indicates that the second entity 118 is assigned as the data authority associated with the second data object representation 420 of the second data object 418. In some implementations, the data authority response 808 includes the second data object representation 420 indicating that the second entity 118 has data authority over any data object (e.g., the second data object 418, one or more additional data objects, or a combination thereof) having a data object representation that matches the second data object representation 420.

At a stage 810, the first entity 104 sends the second data object 418 to the third entity 412. In some implementations, the first entity 104 sends the second data object 418 to the third entity 412 in response to receiving a request 812 from the third entity 412 to send a data object to the third entity 412. In some aspects, the third entity 412 sends the request 812 to the first entity 104 in response to receiving the response 608 from the data authority manager 108 and determining that the response 608 indicates that the first data object 152 is outdated and that the first entity 104 has data authority, as described with reference to FIG. 6. In some implementations, the first entity 104 sends the second data object 418 to the third entity 412 independently of receiving the request 812.

A technical advantage of the system 160 includes enabling the second entity 118 to request data authority and enabling data authority transfer to the second entity 118 upon approval from the first entity 104. For example, entities can initiate and approve transfers of data authority without a single central entity (e.g., the data authority manager 108) determining when and whether to initiate data authority transfers.

Referring to FIG. 9, a diagram 900 is shown of an illustrative aspect of operations that can be performed by the system 160 of FIG. 1. For example, the diagram 900 illustrates examples of different stages of operation of the system 160 that are subsequent to the stages of operations illustrated in the diagram 800 of FIG. 8.

At a stage 902, the data authority manager 108 receives a data update request 904 to update the second data object 418 to a third data object 920. The data update request 904 includes an update 922. In some implementations, the data update request 904 also includes the second data object representation 420 of the second data object 418.

In some aspects, the second entity 118 is configured to generate the third data object 920. For example, the second data object 418 is a CAD drawing and the third data object 920 is an update or modification of that CAD drawing. The second entity 118 generates the third data object representation 918 of the third data object 920. In some examples, the third data object representation 918 includes check data, at least a portion, or both, of the third data object 920.

In some examples, the update 922 is based on a difference between the second data object representation 420 and the third data object representation 918, and the data authority manager 108 generates the third data object representation 918 based on applying the update 922 to the second data object representation 420. In other examples, the update 922 includes the third data object representation 918.

At a stage 906, the data authority manager 108, in response to receiving the data update request 904 from the second entity 118, determines whether the second data object representation 420 included in the data update request 904 matches a data object representation associated any data token accessible to the data authority manager 108. For example, the data authority manager 108, in response to determining that the second data object representation 420 matches the second data object representation 420 associated with the token 504, determines that the second data object representation 420 matches the token 504. The data authority manager 108, in response to determining that there is no data update token that is related and subsequent to the token 504, determines that the token 504 is the most recent data token.

The data authority manager 108, in response to determining that a reference indicates that the token 704 is related and subsequent to the token 504, that a reference indicates that the token 804 is related and subsequent to the token 704, and that the token 804 is an authority token, determines that the token 804 is an authority token that is related and subsequent to the token 504. The data authority manager 108, in response to determining that there are no references indicating any authority token related and subsequent to the token 804, determines that the token 804 is the most recent authority token that is related and subsequent to the token 504. The data authority manager 108 determines that the second entity 118 indicated by the token 804 has data authority.

The data authority manager 108, in response to determining that the second data object representation 420 matches the token 504, that the token 504 is the most recent data token, and that the token 804 is the most recent authority token indicating that the second entity 118 has data authority, generates a token 908 (e.g., a data update token) indicating a data update. For example, the token 908 includes or is associated with the third data object representation 918 of the third data object 920 (e.g., an updated version of the second data object 418). The data authority manager 108 also generates a reference that indicates that the token 908 is related and subsequent to the token 804. In some implementations, the data authority manager 108, in response to generating the token 908, sends a response to the second entity 118 indicating that the data update is successful.

At a stage 910, the data authority manager 108 receives a data validation request 912 from the third entity 412, the data validation request 912 includes the second data object representation 420 of the second data object 418. The third entity 412 generates the second data object representation 420 of the second data object 418. In some examples, the second data object representation 420 includes check data, at least a portion, or both, of the second data object 418.

A technical advantage of the system 160 includes enabling the second entity 118 to request data authority and to update a data object after receiving the data authority. In an example, the data authority manager 108 tracks data authority transfers and data updates.

Referring to FIG. 10, a diagram 1000 is shown of an illustrative aspect of operations that can be performed by the system 160 of FIG. 1. For example, the diagram 1000 illustrates examples of different stages of operation of the system 160 that are subsequent to the stages of operations illustrated in the diagram 900 of FIG. 9.

At a stage 1002, the data authority manager 108, in response to receiving the data validation request 912 of FIG. 9 from the third entity 412, determines whether the second data object representation 420 matches a data object representation associated with any data tokens accessible to the data authority manager 108. For example, the data authority manager 108, in response to determining that the second data object representation 420 included in the data validation request 912 matches the second data object representation 420 associated with the token 504, determines that the second data object representation 420 matches the token 504. The data authority manager 108, in response to determining that one or more references indicate that the token 908 is related and subsequent to the token 504, that the token 908 is a data token, and that the third data object representation 918 associated with the token 908 does not match the second data object representation 420, determines that the second data object representation 420 is outdated.

The data authority manager 108, in response to determining that the second data object representation 420 included in the data validation request 912 matches the token 504, that one or more references indicate that the token 804 is the most recent authority token that is related to the token 504, determines that the second entity 118 indicated by the token 804 has data authority.

The data authority manager 108, in response to determining that the second data object representation 420 is outdated and that the second entity 118 has data authority, sends a data validation response 1004 to the third entity 412 indicating that the second data object 418 is invalid and that the second entity 118 has the data authority.

At a stage 1006, the third entity 412 sends a request 1008 to the second entity 118 to send the third data object 920 to the third entity 412. In some examples, the third entity 412 sends the request 1008 in response to receiving the data validation response 1004 from the data authority manager 108 indicating that the second entity 118 has data authority. In some aspects, the second entity 118 is unresponsive. For example, the second entity 118 is offline and unable to send the third data object 920 to the third entity 412.

At a stage 1010, the third entity 412, in response to determining that no communication is received from the second entity 118 within a threshold duration of sending the request 1008 to the second entity 118, determines that the second entity 118 is unresponsive and sends a request 1012 to revert data authority from the second entity 118. In some examples, the request 1012 includes the second data object representation 420 of the second data object 418 (e.g., the outdated data object) that is available at the third entity 412.

The data authority manager 108, in response to receiving the request 1012 to revert data authority from the second entity 118, determines whether a data authority reversion criterion is satisfied. In an example, the data authority manager 108, in response to determining that the request 1012 includes the second data object representation 420, verifies whether the second entity 118 that is identified in the request 1012 has data authority related to the second data object representation 420. To illustrate, the data authority manager 108, in response to determining that the second data object representation 420 matches the token 504, and that the token 804 is the most recent authority token related to the token 504, determines whether the entity indicated by the token 804 as having data authority matches the data authority identified in the request 1012. To illustrate, the data authority manager 108, in response to determining that each of the token 804 and the request 1012 indicates the second entity 118, verifies that the second entity 118 identified in the request 1012 has data authority related to the second data object representation 420.

The data authority manager 108, in response to verifying that the second entity 118 that is identified in the request 1012 has data authority, determines whether the second entity 118 is unresponsive. In some implementations, the data authority manager 108, in response to receiving the request 1012 indicating that the second entity 118 is detected as unresponsive to the third entity 412, determines that the second entity 118 is unresponsive.

In some implementations, the data authority manager 108 sends a request to the second entity 118 at a first time and, in response to determining that no response is received from the second entity 118 within a threshold duration of the first time, determines that the second entity 118 is unresponsive. In some aspects, the data authority manager 108 determines that the second entity 118 is unresponsive in response to determining that a timer (e.g., corresponding to the threshold duration) has expired since a previous communication with the second entity.

The data authority manager 108, in response to determining that the second entity 118 has data authority and that the second entity 118 is unresponsive, selects an entity to revert to as data authority. In some implementations, the data authority manager 108 is configured to revert authority to an entity that most recently had data authority prior to the second entity 118. For example, the data authority manager 108, in response to determining that one or more references indicate that the token 110 is a most recent authority token that is prior to the token 804 and that the token 110 identifies the first entity 104 as having data authority, determines that the first entity 104 is the most recent entity to have data authority prior to the second entity 118. In these implementations, the data authority manager 108 selects the first entity 104 to revert to as data authority.

In some alternative implementations, the data authority manager 108 is configured to poll entities that previously had data authority and select an entity based on the responses from the entities. In an example in which one or more references indicate multiple authority tokens that are related and prior to the token 804, the data authority manager 108 determines the multiple entities identified by the multiple authority tokens and requests the multiple entities to vote for an entity to be granted data authority. For example, the data authority manager 108 sends data authority reversion vote requests to the multiple entities. The data authority manager 108, in response to receiving one or more votes (e.g., data authority reversion votes) from the multiple entities within a threshold duration of requesting the votes, selects an entity based on the one or more votes. For example, the data authority manager 108, in response to determining that a majority of the one or more votes indicate the first entity 104, selects the first entity 104 to revert to as data authority.

Referring to FIG. 11, a diagram 1100 is shown of an illustrative aspect of operations that can be performed by the system 160 of FIG. 1. For example, the diagram 1100 illustrates examples of different stages of operation of the system 160 that are subsequent to the stages of operations illustrated in the diagram 1000 of FIG. 10.

At a stage 1102, the data authority manager 108, in response to selecting the first entity 104 to revert to as data authority, sends a data authority reversion request 1104 to the first entity 104. In some aspects, the data authority reversion request 1104 includes the second data object representation 420 included in the request 1012 of FIG. 10.

At a stage 1106, the data authority manager 108, based on a receipt of a data authority reversion response 1108 from the first entity 104 indicating that reversion of the data authority to the first entity 104 is approved, determines that the data authority reversion criterion is satisfied. In some aspects, the data authority reversion response 1108 can include the second data object representation 420.

At a stage 1110, the data authority manager 108, in response to determining that the data authority reversion criterion is satisfied, generates a token 1112 (e.g., a data authority reverted token). The token 1112 indicates a reversion of data authority to the first entity 104. In some aspects, the token 1112 also indicates a rollback to a most recent version of data while the first entity 104 had data authority.

In an example, the data authority manager 108, identifies the token 110 as the most recent authority token associated with the first entity 104 (e.g., the entity selected to revert to as data authority). The data authority manager 108 determines whether the first entity 104 performed any data updates. For example, the data authority manager 108, in response to determining that the token 504 is the most recent data token subsequent to the token 110 and prior to a next authority token (e.g., the token 804), determines that the second data object representation 420 associated with the token 504 corresponds to the most recent data update performed by the first entity 104 and associates the second data object representation 420 with the token 1112.

In some other examples, the data authority manager 108, in response to determining that there are no data tokens subsequent to the token 110 (e.g., the most recent authority token associated with the first entity 104) and prior to the token 804 (e.g., the next authority token after the token 110), determines that the first entity 104 did not perform any data updates. The data authority manager 108, in response to determining that the first entity 104 did not perform any updates, rolls back to the most recent data object representation associated with the token 110. For example, the data authority manager 108 identifies a particular data object representation associated with the most recent authority token (e.g., the token 110) of the first entity 104 (e.g., the entity selected to revert to as data authority) and associates the particular data object representation with the token 1112.

The data authority manager 108 identifies the particular data object representation based on a token type of the most recent authority token of the first entity 104 (e.g., the entity selected to revert to as data authority). For example, when the most recent authority token associated with the first entity 104 is a data creation token (e.g., the token 110), the data authority manager 108 identifies a particular data object representation (e.g., the first data object representation 150) that is associated with the data creation token and associates the particular data object representation with the token 1112. In another example, when the most recent authority token associated with the first entity 104 is a data authority reverted token, the data authority manager 108 identifies a particular data object representation that is associated with the data authority reverted token and associates the particular data object representation with the token 1112. In yet another example, when the most recent authority token associated with the first entity 104 is a data authority transferred token and not a data token, the data authority manager 108 identifies a particular data object representation that is associated with a most recent data token that is prior to the data authority transferred token and associates the particular data object representation with the token 1112.

The data authority manager 108 also generates a reference that indicates that the token 1112 is related and subsequent to the token 908, the token 804, the token 704, the token 604, the token 504, and the token 110. The authority tokens linked with references correspond to documentation of a historical lineage of authority changes throughout the lifecycle of the data object. For example, the token 110, the token 504, the token 804, the token 908, and the token 1112 indicate that the first entity 104 had data authority of data objects having data object representations that match the first data object representation 150, that the first entity 104 updated the data object and that the second data object representation 420 corresponds to the updated data object, that data authority had previously been transferred from the first entity 104 to the second entity 118, that the second entity 118 updated the data object and that the third data object representation 918 corresponds to the updated data object, and that data authority is reverted to the first entity and the second data object representation 420 corresponds to rolled back data object.

A technical advantage of the system 160 includes an ability to roll back data authority and data when a data authority becomes unresponsive. For example, data authority is rolled back to an entity that previously had data authority and a particular data object representation associated with entity is selected as a rolled back version.

Figure 12:
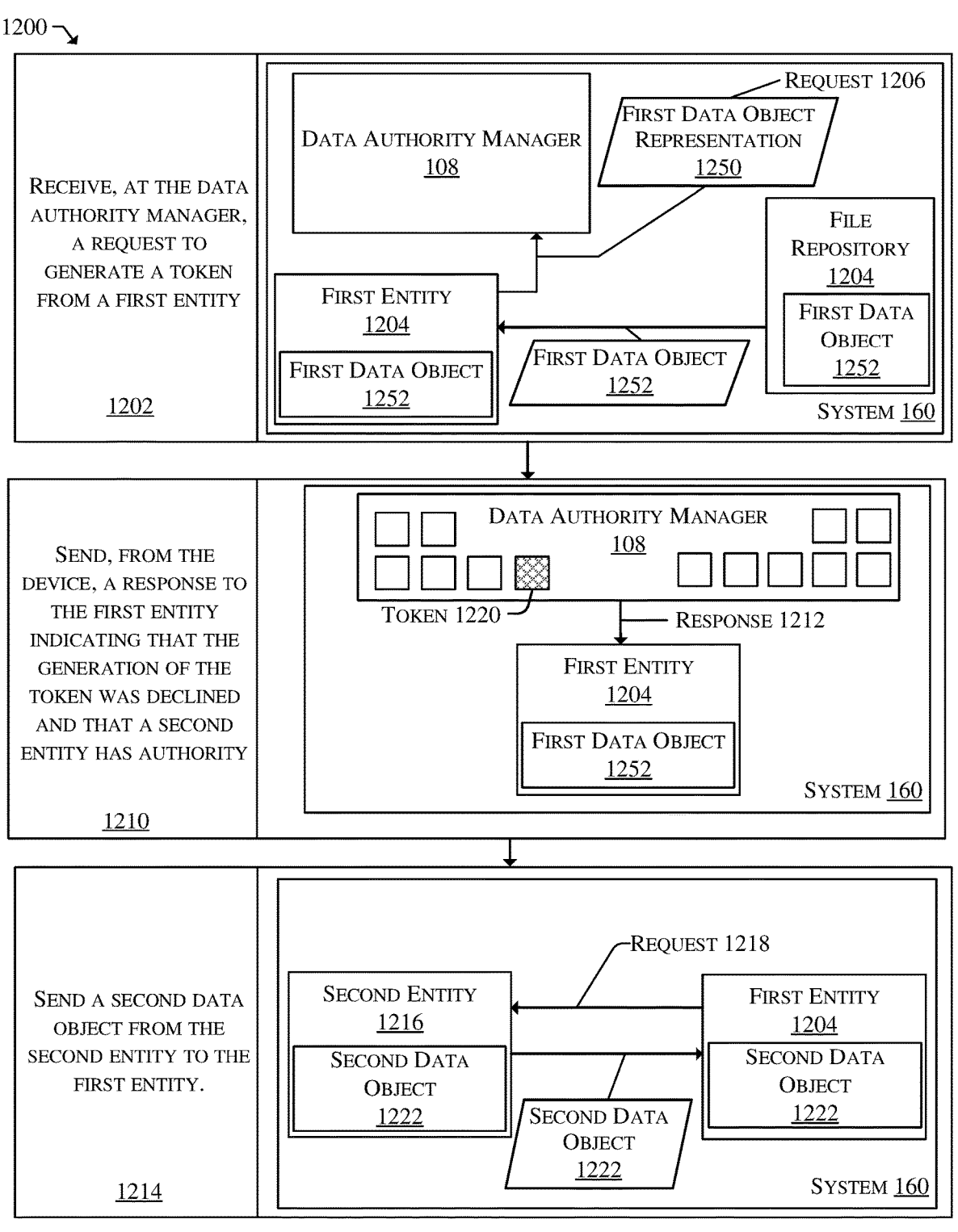
FIG. 12 is a diagram that illustrates an illustrative aspect of operations that can be performed by the system of FIG. 1.

Referring to FIG. 12, a diagram 1200 is shown of an illustrative aspect of operations that can be performed by the system 160 of FIG. 1. For example, the diagram 1200 illustrates examples of different stages of operation of the system 160.

In FIG. 12, an example is illustrated of a use case in which an entity obtains a data object from a file repository and requests a token for the data object from the data authority manager, and the data authority manager verifies whether another entity already has data authority. At a stage 1202, the data authority manager 108 receives a token creation request 1206 from a first entity 1204 to generate a token. The token creation request 1206 includes a first data object representation 1250 of a first data object 1252.

At a stage 1210, the data authority manager 108, in response to receiving the token creation request 1206, determines whether the first data object representation 1250 indicated in the token creation request 1206 matches a data object representation associated with any previous data tokens accessible to the data authority manager 108. The data authority manager 108, in response to determining that the first data object representation 1250 matches a particular data object representation associated with a token 1220 (e.g., a previous data token), determines that a token creation criterion is not satisfied. In an example, the token 1220 corresponds to the token 110 and the particular data object representation corresponds to the first data object representation 150 of FIG. 1. In this example, the data authority manager 108, in response to determining that the first data object representation 1250 matches the first data object representation 150 associated with the token 110 and that the first entity 1204 is different from the first entity 104 associated with the token 110, determines that the token creation criterion is not satisfied. The data authority manager, in response to determining that the token creation criterion is not satisfied, sends a token creation response 1212 to the first entity 1204 indicating that the token creation criterion is not satisfied.

The data authority manager 108, in response to determining that a most recent authority token associated with the token 1220 indicates that a second entity 1216 has data authority, generates a token creation response 1212 indicating that the second entity 1216 has data authority. In an example, the token 1220 corresponds to the token 110, and the most recent authority token corresponds to the token 1112 indicating that the first entity 104 has data authority, as described with reference to FIG. 11. In this example, the second entity 1216 corresponds to the first entity 104 and the data authority manager 108 generates the token creation response 1212 indicating that the first entity 104 has data authority.

In a particular aspect, the data authority manager 108, in response to determining that there are no references indicating a data token that is related and subsequent to the token 1220, determines that the particular data object representation associated with the token 1220 is up-to-date and the first data object representation 1250 that matches the particular data object representation is also up to date. In some implementations, the data authority manager 108, in response to determining that the particular data object representation associated with the token 1220 is up to date, generates the token creation response 1212 indicating that the first data object representation 1250 is valid and up to date.

Alternatively, the data authority manager 108, in response to determining that there are one or more references indicating a data token that is related and subsequent to the token 1220, determines that the particular data object representation associated with the token 1220 is outdated and the first data object representation 1250 that matches the particular data object representation is also outdated. In some implementations, the data authority manager 108, in response to determining that the particular data object representation associated with the token 1220 is outdated, generates the token creation response 1212 indicating that the first data object representation 1250 is outdated. In an example, the token 1220 corresponds to the token 110, one or more references indicate that the token 1112 is data token that is related and subsequent to the token 110, and that the token 1112 is associated with the second data object representation 420 indicating that first data object representation 150 associated with token 110 is outdated, as described with reference to FIG. 11. In this example, the token creation response 1212 indicates that the first data object representation 1250 (e.g., the first data object representation 150) is outdated.

At a stage 1214, the second entity 1216 sends a second data object 1222 to the first entity 1204. In some implementations, the second entity 1216 sends the second data object 1222 to the first entity 1204 in response to receiving a request 1218 from the first entity 1204 to send a most recent version of a data object to the first entity 1204. For example, the second data object 1222 is the most recent version and the second entity 1216 sends that version to the first entity 1204. In a particular aspect, the first entity 1204 sends the request 1218 to the second entity 1216 in response to determining that the token creation response 1212 indicates that the second entity 1216 has data authority and that the first data object representation 1250 is outdated. In an example, the second entity 1216 corresponds to the first entity 104 and the token creation response 1212 indicates that the first entity 104 has data authority. In this example, the first entity 1204 sends the request 1218 to the first entity 104 and the first entity 104 sends the second data object representation 420 to the first entity 1204. In some implementations, the second entity 1216 (e.g., the first entity 104) sends the second data object 1222 to the first entity 1204 independently of receiving the request 1218.

A technical advantage of the system 160 includes enabling at most a single entity at a time to have data authority of data objects that match a particular data object representation. Multiple entities are thus prevented from storing conflicting data updates at the data authority manager 108.

Referring to FIG. 13, an example of a method 1300 of token-based data authority management is shown. In a particular aspect, one or more operations of the method 1300 can be performed by the data authority manager 108, the system 160 of FIG. 1, or both.

The method 1300 includes, at block 1302, obtaining, at a device, a first token indicating that a first entity has data authority of a first data object. For example, the data authority manager 108 is configured to store one or more tokens. The one or more tokens are be configured to reference each other, reference a portion of each other, or individually be associated with a data object. The one or more tokens include a data object representation. In some aspects, the data authority manager 108 obtains a token 110 by generating the token 110 in response to receiving a token creation request 106 from the first entity 104, as described with reference to FIG. 1. The token 110 indicates that the first entity 104 has data authority of the first data object 152. In some aspects, the data authority manager 108 obtains the token 110 from a data storage.

The method 1300 includes, at block 1304, receiving, at the device, a data authority request from a second entity to transfer data authority of the first data object to the second entity. For example, the data authority manager 108, in response to receiving a data authority request 204 indicating a second data object representation 154, determines whether the second data object representation 154 matches a data object representation associated with any data tokens accessible to the data authority manager 108, as described with reference to FIG. 2.

The data authority manager 108, in response to determining that the second data object representation 154 matches the first data object representation 150 associated with the token 110, determines that the data authority request 204 corresponds to a request to transfer data authority of data objects (e.g., the first data object 152, the second data object 116, one or more additional data objects, or a combination thereof) having data object representations that match the first data object representation 150.

The method 1300 includes, at block 1306, based on determining that a data authority transfer criterion is satisfied, generating a second token indicating that the second entity has the data authority of the first data object. In an example, the data authority manager 108, in response to determining that the token 110 is the most recent data token related to the first data object representation 150, determines that the second data object representation 154 that matches the first data object representation 150 is up to date. The data authority manager 108, in response to determining that the second data object representation 154 is up to date and that the token 110 is the most recent authority token associated with the first data object representation 150, sends an authority transfer request 212 to the first entity 104 that is indicated by the token 110 as having data authority, as described with reference to FIG. 2. The data authority manager 108, in response to receiving an authority transfer response 216 from the first entity 104 indicating that a transfer of authority to the second entity 118 is approved, determines that a data authority transfer criterion is satisfied. The data authority manager 108, in response to determining that the data authority transfer criterion is satisfied, generates a token 304 (e.g., a data authority transferred token) indicating a transfer of data authority to the second entity 118, as described with reference to FIG. 3.

The method 1300 includes, at block 1308, generating, at the device, a first reference indicating that the second token is related and subsequent to the first token. For example, the data authority manager 108 generates a reference that indicates that the token 304 is related and subsequent to the token 110, as described with reference to FIG. 3. Such references and authority tokens provide a historical lineage of authority changes throughout the lifecycle of a data object.

The method 1300 in some implementations includes receiving, from the second entity, a data update request including a data update and a data object representation. For example, as described with reference to FIG. 4, the data update request 416 includes the update 422. In some implementations, the data update request 416 also includes the first data object representation 150 of the first data object 152.

In some aspects, the first entity 104 is configured to generate the second data object 418. For example, the first data object 152 can be a CAD drawing and the second data object 418 corresponds to an update or modification of the CAD drawing. The first entity 104 generates the second data object representation 420 of the second data object 418. In some examples, the second data object representation 420 includes check data, at least a portion, or both, of the second data object 418. In some examples, the update 422 is based on differences between the first data object representation 150 and the second data object representation 420, and the data authority manager 108 generates the second data object representation 420 based on applying the update 422 to the first data object representation 150. In some examples, the update 422 includes the second data object representation 420.

As another example, as described with reference to FIG. 9, the data update request 904 includes the update 922. In some implementations, the data update request 904 also includes the second data object representation 420. In some examples, the update 922 includes the third data object representation 918. In other examples, the update 922 includes differences between the second data object representation 420 and the third data object representation 918, and the data authority manager 108 applies the update 922 to the second data object representation 420 to generate the third data object representation 918.

The method 1300 in some implementations further includes based on determining that the data object representation matches a third token, that the third token is a most recent data token of the first data object, and that the second token is a most recent authority token: applying the data update to a second data object representation associated with the third token to generate a third data object representation; generating a fourth token indicating a data update; and generating a third reference indicating that the fourth token is related and subsequent to the second token, the third token, or both.

For example, as described with reference to FIG. 5, the data authority manager 108, in response to determining that the first data object representation 150 (indicated in the data update request 416) matches the first data object representation 150 associated with the token 110, determines that the first data object representation 150 matches the token 110. The data authority manager 108, in response to determining that there is no data update token that is related and subsequent to the token 110, determines that the token 110 is the most recent data token. The data authority manager 108, in response to determining that there is no authority token that is related and subsequent to the token 110, determines that the token 110 is the most recent authority token and that the first entity 104 indicated by the token 110 has data authority.

The data authority manager 108, in response to determining that the first data object representation 150 (indicated in the data update request 416) matches the token 110, that the token 110 is the most recent data token, and that the token 110 is the most recent authority token indicating that the first entity 104 has data authority, applies the update 422 to the first data object representation 150 to generate the second data object representation 420 and generates a token 504 (e.g., a data update token) indicating a data update. For example, the token 504 includes or is associated with the second data object representation 420 of the second data object 418 (e.g., an updated version of the first data object 152). The data authority manager 108 also generates a reference that indicates that the token 504 is related and subsequent to the token 110. In some implementations, the data authority manager 108, in response to generating the token 504, sends a response to the first entity 104 indicating that the data update is successful.

As another example, as described with reference to FIG. 9, the data authority manager 108, in response to determining that the second data object representation 420 (indicated in the data update request 904) matches the second data object representation 420 associated with the token 504, determines that the second data object representation 420 matches the token 504. The data authority manager 108, in response to determining that there is no data update token that is related and subsequent to the token 504, determines that the token 504 is the most recent data token.

The data authority manager 108, in response to determining that the token 804 is the most recent authority token related to the token 504, determines that the second entity 118 indicated by the token 804 has data authority. The data authority manager 108, in response to determining that the second data object representation 420 matches the token 504, that the token 504 is the most recent data token, and that the token 804 is the most recent authority token indicating that the first entity 104 has data authority, applies the update 922 to the second data object representation 420 to generate the third data object representation 918 and generates a token 908 (e.g., a data update token) indicating a data update. For example, the token 908 includes or is associated with the third data object representation 918 of the third data object 920 (e.g., an updated version of the first data object 152 and the second data object 418). The data authority manager 108 also generates a reference that indicates that the token 908 is related and subsequent to the token 110, the token 504, the token 804, or a combination thereof. In some implementations, the data authority manager 108, in response to generating the token 908, sends a response to the second entity 118 indicating that the data update is successful.

FIG. 14 is a block diagram of a computing environment 1400 including a computing device 1402 configured to support aspects of computer-implemented methods and computer-executable program instructions (or code) according to the present disclosure. For example, the computing device 1402, or portions thereof, is configured to execute instructions to initiate, perform, or control one or more operations described with reference to FIGS. 1-13.

The computing device 1402 includes one or more processors 1404. The processor(s) 1404 are configured to communicate with system memory 1412, one or more storage devices 1420, one or more input/output interfaces 1406, one or more communications interfaces 1410, or any combination thereof. The system memory 1412 includes volatile memory devices (e.g., random access memory (RAM) devices), nonvolatile memory devices (e.g., read-only memory (ROM) devices, programmable read-only memory, and flash memory), or both. The system memory 1412 stores an operating system 1414, which may include a basic input/output system for booting the computing device 1402 as well as a full operating system to enable the computing device 1402 to interact with users, other programs, and other devices. The system memory 1412 stores system (program) data 1418, such as any data used or generated by the data authority manager 108, one or more entities, or a combination thereof, as described with reference to FIGS. 1-13. For example, in some implementations, the program data 1418 includes data indicative of one or more tokens, one or more object data representations, one or more references, or a combination thereof.

The system memory 1412 includes one or more applications 1416 (e.g., sets of instructions) executable by the processor(s) 1404. As an example, the one or more applications 1416 include instructions executable by the processor(s) 1404 to initiate, control, or perform one or more operations described with reference to FIGS. 1-13. To illustrate, the one or more applications 1416 include instructions executable by the processor(s) 1404 to initiate, control, or perform one or more operations described with reference to the data authority manager 108, an entity manager 1424, or both. The entity manager 1424 is associated with (e.g., represents) an entity. In a particular aspect, the entity manager 1424 is configured to perform one or more operations described with reference to the first entity 104, the second entity 118 of FIG. 1, the third entity 312 of FIG. 3, the third entity 412 of FIG. 4, the first entity 1204, the second entity 1216 of FIG. 12, or a combination thereof.

An entity can include a software application, an interface, a device, a system, a user, a network, an organization, or any other type of entity that is capable of having data authority of a data object, capable of accessing a data object, or both. In some aspects, the entity manager 1424 communicates with a data authority manager 108 on behalf of the entity.

In some implementations, the one or more applications 1416 include one or more instances of the data authority manager 108 and one or more instances of the entity manager 1424. For example, a data authority manager 108 can manage data authority for one or more entities (e.g., software applications) included in the computing device 1402. In some implementations, the one or more applications 1416 include a data authority manager 108 configured to communicate with one or more entities that are external to the computing device 1402. In some implementations, the one or more applications 1416 include an entity manager 1424 that is configured to communicate with a data authority manager that is external to the computing device 1402.

In some examples, the one or more applications 1416 include one or more instances of the data authority manager 108 and do not include any instances of the entity manager 1424. In these examples, the program data 1418 includes data generated or used by the data authority manager 108 (e.g., tokens, references, data object representations, or a combination thereof) and does not include data that would be available to the entity manager 1424 and is not available to the data authority manager 108 (e.g., data objects). In some alternative examples, the one or more applications 1416 include one or more instances of the entity manager 1424 and do not include any instances of the data authority manager 108. In these examples, the program data 1418 includes data generated or used by the entity manager 1424 (e.g., data objects, data object representations, or a combination thereof) and does not include data that would be available to the data authority manager 108 but is not available to the entity manager 1424 (e.g., tokens, references, or a combination thereof).

In a particular implementation, the system memory 1412 includes a non-transitory, computer readable medium storing the instructions that, when executed by the processor(s) 1404, cause the processor(s) 1404 to initiate, perform, or control operations to aid in in token-based data authority management. The operations include obtaining a first token that indicates that a first entity (e.g., the first entity 104) has data authority of a first data object (e.g., the first data object

152). The operations also include receiving a data authority request (e.g., the data authority request 204) from a second entity (e.g., the second entity 118) to transfer the data authority of the first data object to the second entity. The operations further include based on a determination that a data authority transfer criterion is satisfied, generating a second token (e.g., the second token 304) indicating that the second entity has the data authority of the first data object. The operations also include generating a first reference that indicates that the second token is related and subsequent to the first token.

The one or more storage devices 1420 include nonvolatile storage devices, such as magnetic disks, optical disks, or flash memory devices. In a particular example, the storage devices 1420 include both removable and non-removable memory devices. The storage devices 1420 are configured to store an operating system, images of operating systems, applications (e.g., one or more of the applications 1416), and program data (e.g., the program data 1418). In a particular aspect, the system memory 1412, the storage devices 1420, or both, include tangible computer-readable media. In a particular aspect, one or more of the storage devices 1420 are external to the computing device 1402.

The one or more input/output interfaces 1406 enable the computing device 1402 to communicate with one or more input/output devices 1408 to facilitate user interaction. For example, the one or more input/output interfaces 1406 can include a display interface, an input interface, or both. For example, the input/output interface 1406 is adapted to receive input from a user, to receive input from another computing device, or a combination thereof. In some implementations, the input/output interface 1406 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1408 includes one or more user interface devices and displays, including some combination of buttons, keyboards, pointing devices, displays, speakers, microphones, touch screens, and other devices.

The processor(s) 1404 are configured to communicate with devices or controllers 1422 via the one or more communications interfaces 1410. For example, the one or more communications interfaces 1410 can include a network interface. The devices or controllers 1422 can include an entity, an entity manager, a data authority manager, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-13. In some implementations, part, or all of one or more of the operations or methods of FIGS. 1-13 may be implemented by one or more processors (e.g., one or more central processing units (CPUs), one or more graphics processing units (GPUs), one or more digital signal processors (DSPs)) executing instructions, by dedicated hardware circuitry, or any combination thereof. Particular aspects of the disclosure are described below in sets of interrelated Examples:

According to Example 1, a device includes a memory configured to store a first token that indicates that a first entity has data authority of a first data object; and one or more processors configured to, receive a data authority request from a second entity to transfer the data authority of the first data object to the second entity; based on a determination that a data authority transfer criterion is satisfied, generate a second token that indicates that the second entity has the data authority of the first data object; and generate a first reference that indicates that the second token is related and subsequent to the first token.

Example 2 includes the device of Example 1, wherein the one or more processors are further configured to, prior to receiving the data authority request from the second entity: receive, from a third entity, a data validation request including a data object representation; and based on a determination that the first token is a most recent data token of the first data object and that the data object representation matches the first token, send a data validation response to the third entity that indicates that the data object representation is valid.

Example 3 includes the device of Example 2, wherein the one or more processors are further configured to generate second check data of a second data object, wherein the data object representation includes the second data object; and determine that the data object representation matches the first token based on a determination that the second check data matches first check data of the first data object.

Example 4 includes the device of Example 2, wherein the one or more processors are further configured to determine that the data object representation matches the first token based on a determination that first check data of the first data object matches second check data, wherein the data object representation includes the second check data.

Example 5 includes the device of any of Examples 1 to 4, wherein check data of a data object includes a hash of the data object, an encryption of the data object, a checksum of the data object, or a combination thereof.

Example 6 includes the device of any of Examples 1 to 5, wherein the one or more processors are further configured to, prior to receiving the data authority request from the second entity: receive, from a third entity, a data validation request that includes a data object representation; and based at least in part on a determination that the first token is the most recent data token of the first data object and that the data object representation does not match the first token, send a data validation response to the third entity that indicates that the data object representation is invalid.

Example 7 includes the device of any of Examples 1 to 6, wherein the one or more processors are further configured to, subsequent to generating the second token: receive, from a third entity, a data validation request that includes a data object representation; and based on a determination that the data object representation matches the first token, and that the first token is the most recent data token of the first data object, send a data validation response to the third entity that indicates that the data object representation is valid.

Example 8 includes the device of any of Examples 1 to 7, wherein the one or more processors are further configured to in response to a receipt of the data authority request from the second entity and a determination that the data authority request includes a data object representation, that the data object representation matches the first token, that the first token is the most recent data token of the first data object, and that a most recent authority token related to the first token indicates that the first entity has the data authority of the first data object, send an authority transfer request to the first entity to authorize transfer of the data authority to the second entity; and based on a receipt of an authority transfer response from the first entity that indicates that the transfer to the second entity is approved, determine that the data authority transfer criterion is satisfied.

Example 9 includes the device of any of Examples 1 to 8, wherein the one or more processors are further configured to receive, from a third entity, a data validation request that includes a data object representation; and based at least in part on a determination that a third token is the most recent data token of the first data object and that the data object representation does not match the third token, send a data validation response to the third entity that indicates that the data object representation is invalid.

Example 10 includes the device of Example 9, wherein the data validation response indicates that the second entity has the data authority.

Example 11 includes the device of Example 10, wherein the one or more processors are further configured to, based on a determination that the data object representation matches the first token, that the data object representation does not match a most recent data token of the first data object, that the second token is the most recent authority token related to the first data object, and that the second token indicates that the second entity has the data authority, generate the data validation response that indicates that the second entity has the data authority.

Example 12 includes the device of any of Examples 1 to 11, wherein the one or more processors are further configured to, based on a determination that a data authority reversion criterion is satisfied: generate a third token that indicates that the first entity has the data authority of the first data object; and generate a second reference that indicates that the third token is related and subsequent to the second token.

Example 13 includes the device of Example 12, wherein the one or more processors are further configured to, in response to a receipt of a request to revert data authority from a third entity, determine whether the data authority reversion criterion is satisfied.

Example 14 includes the device of Example 12 or Example 13, wherein the one or more processors are further configured to, in response to a detection that a timer has expired since a previous communication with the second entity, determine whether the data authority reversion criterion is satisfied.

Example 15 includes the device of any of Examples 12 to 14, wherein the one or more processors are further configured to send a data authority reversion request to the first entity; and based on a receipt of a data authority reversion response from the first entity that indicates that a reversion of the data authority to the first entity is approved, determine that the data authority reversion criterion is satisfied.

Example 16 includes the device of any of Examples 12 to 15, wherein the one or more processors are further configured to determine that authority tokens of multiple entities are associated with the first data object; send data authority reversion vote requests to the multiple entities; based on data authority reversion votes received from one or more of the multiple entities, select the first entity to revert to as data authority and send a data authority reversion request to the first entity; and based on receipt of a data authority reversion response from the first entity that indicates that a reversion of the data authority to the first entity is approved, determine that the data authority reversion criterion is satisfied.

Example 17 includes the device of any of Examples 1 to 16, wherein the one or more processors are further configured to receive, from a third entity, a token creation request that includes a data object representation; and based on a determination that the data object representation matches the first token, that the first token is the most recent data token of the first data object, that the second token is a most recent authority token related to the first token, and that the second token indicates that the second entity has the data authority, send a token creation response to the third entity that indicates that the second entity has the data authority of the first data object.

Example 18 includes the device of any of Examples 1 to 17, wherein the one or more processors are further configured to: receive, from the second entity, a data update request including a data update and a data object representation; and based on determining that the data object representation matches a third token, that the third token is the most recent data token of the first data object, and that the second token is a most recent authority token of the first data object: apply the data update to a second data object representation associated with the third token to generate a third data object representation; generate a fourth token indicating a data update; and generate a third reference indicating that the fourth token is related and subsequent to the second token, the third token, or both.

According to Example 19, a method includes obtaining, at a device, a first token indicating that a first entity has data authority of a first data object; receiving, at the device, a data authority request from a second entity to transfer data authority of the first data object to the second entity; based on determining that a data authority transfer criterion is satisfied, generating a second token indicating that the second entity has the data authority of the first data object; and generating, at the device, a first reference indicating that the second token is related and subsequent to the first token.

Example 20 includes the method of Example 19, and further includes, receiving, from the second entity, a data update request including a data update and a data object representation; and based on determining that the data object representation matches a third token, that the third token is a most recent data token of the first data object, and that the second token is a most recent authority token of the first data object: applying the data update to a second data object representation associated with the third token to generate a third data object representation; generating a fourth token indicating a data update; and generating a third reference indicating that the fourth token is related and subsequent to the second token, the third token, or both.

Example 21 includes the method of Example 19 or Example 20, and further includes, prior to receiving the data authority request from the second entity: receiving, from a third entity, a data validation request including a data object representation; and based on a determination that the first token is the most recent data token of the first data object and that the data object representation matches the first token, sending a data validation response to the third entity that indicates that the data object representation is valid.

Example 22 includes the method of Example 21, and further includes, generating second check data of a second data object, wherein the data object representation includes the second data object; and determining that the data object representation matches the first token based on a determination that the second check data matches first check data of the first data object.

Example 23 includes the method of Example 21, and further includes, determining that the data object representation matches the first token based on a determination that first check data of the first data object matches second check data, wherein the data object representation includes the second check data.

Example 24 includes the method of any of Examples 19 to 23, wherein check data of a data object includes a hash of the data object, an encryption of the data object, a checksum of the data object, or a combination thereof.

Example 25 includes the method of any of Examples 19 to 24, and further includes, prior to receiving the data authority request from the second entity: receiving, from a third entity, a data validation request that includes a data object representation; and based at least in part on a determination that the first token is the most recent data token of the first data object and that the data object representation does not match the first token, sending a data validation response to the third entity that indicates that the data object representation is invalid.

Example 26 includes the method of any of Examples 19 to 25, and further includes, subsequent to generating the second token: receiving, from a third entity, a data validation request that includes a data object representation; and based on a determination that the data object representation matches the first token, and that the first token is the most recent data token of the first data object, sending a data validation response to the third entity that indicates that the data object representation is valid.

Example 27 includes the method of any of Examples 19 to 26, and further includes, in response to a receipt of the data authority request from the second entity and a determination that the data authority request includes a data object representation, that the data object representation matches the first token, that the first token is the most recent data token of the first data object, and that a most recent authority token related to the first token indicates that the first entity has the data authority of the first data object, sending an authority transfer request to the first entity to authorize transfer of the data authority to the second entity; and based on a receipt of an authority transfer response from the first entity that indicates that the transfer to the second entity is approved, determining that the data authority transfer criterion is satisfied.

Example 28 includes the method of any of Examples 19 to 27, and further includes, receiving, from a third entity, a data validation request that includes a data object representation; and based at least in part on a determination that a third token is the most recent data token of the first data object and that the data object representation does not match the third token, sending a data validation response to the third entity that indicates that the data object representation is invalid.

Example 29 includes the method of Example 28, wherein the data validation response indicates that the second entity has the data authority.

Example 30 includes the method of Example 29, further includes, based on a determination that the data object representation matches the first token, that the data object representation does not match a most recent data token of the first data object, that the second token is the most recent authority token related to the first data object, and that the second token indicates that the second entity has the data authority, generating the data validation response that indicates that the second entity has the data authority.

Example 31 includes the method of any of Examples 19 to 30, and further includes, based on a determination that a data authority reversion criterion is satisfied: generating a third token that indicates that the first entity has the data authority of the first data object; and generating a second reference that indicates that the third token is related and subsequent to the second token.

Example 32 includes the method of Example 31, and further includes, in response to a receipt of a request to revert data authority from a third entity, determining whether the data authority reversion criterion is satisfied.

Example 33 includes the method of Example 31 or Example 32, and further includes, in response to a detection that a timer has expired since a previous communication with the second entity, determining whether the data authority reversion criterion is satisfied.

Example 34 includes the method of any of Examples 31 to 33, and further includes, sending a data authority reversion request to the first entity; and based on a receipt of a data authority reversion response from the first entity that indicates that a reversion of the data authority to the first entity is approved, determining that the data authority reversion criterion is satisfied.

Example 35 includes the method of any of Examples 31 to 34, and further includes, determining that authority tokens of multiple entities are associated with the first data object; sending data authority reversion vote requests to the multiple entities; based on data authority reversion votes received from one or more of the multiple entities, selecting the first entity to revert to as data authority and send a data authority reversion request to the first entity; and based on receipt of a data authority reversion response from the first entity that indicates that a reversion of the data authority to the first entity is approved, determining that the data authority reversion criterion is satisfied.

Example 36 includes the device of any of Examples 19 to 35, and further includes receiving, from a third entity, a token creation request that includes a data object representation; and based on a determination that the data object representation matches the first token, that the first token is the most recent data token of the first data object, that the second token is a most recent authority token related to the first token, and that the second token indicates that the second entity has the data authority, sending a token creation response to the third entity that indicates that the second entity has the data authority of the first data object.

According to Example 37, a non-transitory computer-readable medium stores instructions that, when executed by one or more processors, cause the one or more processors to: obtain a first token that indicates that a first entity has data authority of a first data object; receive a data authority request from a second entity to transfer the data authority of the first data object to the second entity; based on a determination that a data authority transfer criterion is satisfied, generate a second token that indicates that the second entity has the data authority of the first data object; and generate a first reference that indicates that the second token is related and subsequent to the first token.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:

a memory configured to store a first token that indicates that a first entity has data authority of a first data object; and one or more processors configured to:

receive a data authority request from a second entity to transfer the data authority of the first data object to the second entity;

based on a determination that a data authority transfer criterion is satisfied, generate a second token that indicates that the second entity has the data authority of the first data object; and generate a first reference that indicates that the second token is related and subsequent to the first token.

2. The device of claim 1, wherein the one or more processors are further configured to, prior to receiving the data authority request from the second entity:

receive, from a third entity, a data validation request including a data object representation; and based on a determination that the first token is a most recent data token of the first data object and that the data object representation matches the first token, send a data validation response to the third entity that indicates that the data object representation is valid.

3. The device of claim 2, wherein the one or more processors are further configured to:

generate second check data of a second data object, wherein the data object representation includes the second data object; and determine that the data object representation matches the first token based on a determination that the second check data matches first check data of the first data object.

4. The device of claim 3, wherein check data of a data object includes a hash of the data object, an encryption of the data object, a checksum of the data object, or a combination thereof.

5. The device of claim 2, wherein the one or more processors are further configured to determine that the data object representation matches the first token based on a determination that first check data of the first data object matches second check data, wherein the data object representation includes the second check data.

6. The device of claim 1, wherein the one or more processors are further configured to, prior to receiving the data authority request from the second entity:

receive, from a third entity, a data validation request that includes a data object representation; and based at least in part on a determination that the first token is a most recent data token of the first data object and that the data object representation does not match the first token, send a data validation response to the third entity that indicates that the data object representation is invalid.

7. The device of claim 1, wherein the one or more processors are further configured to, subsequent to generating the second token:

receive, from a third entity, a data validation request that includes a data object representation; and based on a determination that the data object representation matches the first token, and that the first token is a most recent data token of the first data object, send a data validation response to the third entity that indicates that the data object representation is valid.

8. The device of claim 1, wherein the one or more processors are further configured to:

in response to a receipt of the data authority request from the second entity and a determination that the data authority request includes a data object representation, that the data object representation matches the first token, that the first token is a most recent data token of the first data object, and that a most recent authority token related to the first token indicates that the first entity has the data authority of the first data object, send an authority transfer request to the first entity to authorize transfer of the data authority to the second entity; and based on a receipt of an authority transfer response from the first entity that indicates that the transfer to the second entity is approved, determine that the data authority transfer criterion is satisfied.

9. The device of claim 1, wherein the one or more processors are further configured to:

receive, from a third entity, a data validation request that includes a data object representation; and based at least in part on a determination that a third token is a most recent data token of the first data object and that the data object representation does not match the third token, send a data validation response to the third entity that indicates that the data object representation is invalid.

10. The device of claim 9, wherein the data validation response indicates that the second entity has the data authority.

11. The device of claim 10, wherein the one or more processors are further configured to, based on a determination that the data object representation matches the first token, that the data object representation does not match the most recent data token of the first data object, that the second token is a most recent authority token related to the first data object, and that the second token indicates that the second entity has the data authority, generate the data validation response that indicates that the second entity has the data authority.

12. The device of claim 1, wherein the one or more processors are further configured to, based on a determination that a data authority reversion criterion is satisfied:

generate a third token that indicates that the first entity has the data authority of the first data object; and generate a second reference that indicates that the third token is related and subsequent to the second token.

13. The device of claim 12, wherein the one or more processors are further configured to, in response to a receipt of a request to revert data authority from a third entity, determine whether the data authority reversion criterion is satisfied.

14. The device of claim 12, wherein the one or more processors are further configured to, in response to a detection that a timer has expired since a previous communication with the second entity, determine whether the data authority reversion criterion is satisfied.

15. The device of claim 12, wherein the one or more processors are further configured to:

send a data authority reversion request to the first entity; and based on a receipt of a data authority reversion response from the first entity that indicates that a reversion of the data authority to the first entity is approved, determine that the data authority reversion criterion is satisfied.

16. The device of claim 12, wherein the one or more processors are further configured to:

determine that authority tokens of multiple entities are associated with the first data object;

send data authority reversion vote requests to the multiple entities;

based on data authority reversion votes received from one or more of the multiple entities, select the first entity to revert to as data authority and send a data authority reversion request to the first entity; and based on receipt of a data authority reversion response from the first entity that indicates that a reversion of the data authority to the first entity is approved, determine that the data authority reversion criterion is satisfied.

17. The device of claim 1, wherein the one or more processors are further configured to:

receive, from a third entity, a token creation request that includes a data object representation; and based on a determination that the data object representation matches the first token, that the first token is a most recent data token of the first data object, that the second token is a most recent authority token related to the first token, and that the second token indicates that the second entity has the data authority, send a token creation response to the third entity that indicates that the second entity has the data authority of the first data object.

18. A method comprising:

obtaining, at a device, a first token indicating that a first entity has data authority of a first data object;

receiving, at the device, a data authority request from a second entity to transfer data authority of the first data object to the second entity;

based on determining that a data authority transfer criterion is satisfied, generating a second token indicating that the second entity has the data authority of the first data object; and generating, at the device, a first reference indicating that the second token is related and subsequent to the first token.

19. The method of claim 18, further comprising:

receiving, from the second entity, a data update request including a data update and a data object representation; and based on determining that the data object representation matches a third token, that the third token is a most recent data token of the first data object, and that the second token is a most recent authority token of the first data object:

applying the data update to a second data object representation associated with the third token to generate a third data object representation;

generating a fourth token indicating a data update; and generating a third reference indicating that the fourth token is related and subsequent to the second token, the third token, or both.

20. A non-transitory computer-readable medium storing instructions that, when executed by one or more processors, cause the one or more processors to:

obtain a first token that indicates that a first entity has data authority of a first data object;

receive a data authority request from a second entity to transfer the data authority of the first data object to the second entity;

based on a determination that a data authority transfer criterion is satisfied, generate a second token that indicates that the second entity has the data authority of the first data object; and generate a first reference that indicates that the second token is related and subsequent to the first token.

* * * * *